United States Patent [19]

Muramoto et al.

[11] Patent Number: 5,627,582
[45] Date of Patent: May 6, 1997

[54] STEREOSCOPIC COMPRESSION PROCESSING WITH ADDED PHASE REFERENCE

[75] Inventors: Tomotaka Muramoto; Masakuni Yamamoto, both of Kanagawa-ken, Japan

[73] Assignee: Canon Kabushiki Kaisha, Tokyo, Japan

[21] Appl. No.: 345,628

[22] Filed: Nov. 28, 1994

[30] Foreign Application Priority Data

Nov. 29, 1993 [JP] Japan ..................... 5-325843
Oct. 21, 1994 [JP] Japan ..................... 6-256719

[51] Int. Cl.⁶ .......................... H04N 13/02; H04N 13/04
[52] U.S. Cl. .......................................................... 348/43
[58] Field of Search ............................. 348/43, 42, 46, 348/47, 51, 55, 56, 57

[56] References Cited

U.S. PATENT DOCUMENTS

| | | | |
|---|---|---|---|
| 4,523,226 | 6/1985 | Lipton et al. | 348/49 |
| 4,583,117 | 4/1986 | Lipton et al. | 348/47 |
| 4,739,418 | 4/1988 | Iwahara et al. | 348/43 |
| 4,862,292 | 8/1989 | Enari et al. | 360/8 |
| 4,979,033 | 12/1990 | Stephens | 348/56 |
| 5,193,000 | 3/1993 | Lipton et al. | 348/43 |
| 5,212,562 | 5/1993 | Ogura | 358/338 |
| 5,294,997 | 3/1994 | Ogura et al. | 358/342 |
| 5,416,510 | 5/1995 | Lipton et al. | 348/43 |

FOREIGN PATENT DOCUMENTS 0204006  12/1986  European Pat. Off. .
706182   3/1954   United Kingdom .

Primary Examiner—Tommy P. Chin
Assistant Examiner—Bryan S. Tung
Attorney, Agent, or Firm—Morgan & Finnegan

[57] ABSTRACT

A stereoscopic image processing apparatus for processing a stereoscopic image signal for a stereoscopic image which is composed of a plurality of images is arranged to receive a plurality of image signals for the plurality of images, to time-base-compress the image signals received, to form a composite image signal by combining the time-base-compressed image signals, to multiplex an information signal for information which is other than images but corresponds to the contents of the plurality of images, and to output the composite image signal to a transmission route. The arrangement enables the apparatus to combine the plurality of image signals for the images forming the stereoscopic image and to transmit the composite image signal together with the information signal for information which is other than images but corresponds to the content of the plurality of images.

6 Claims, 24 Drawing Sheets

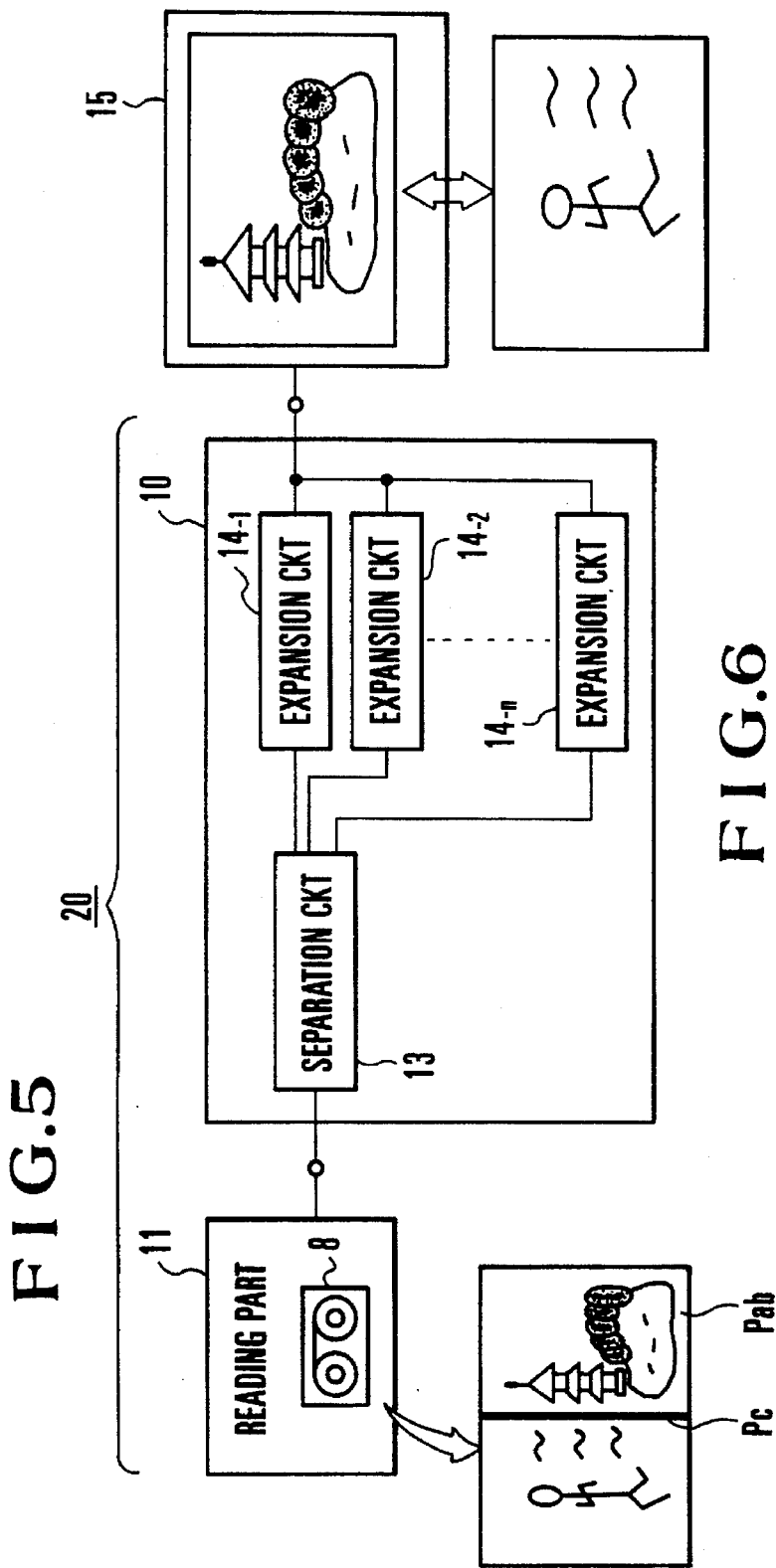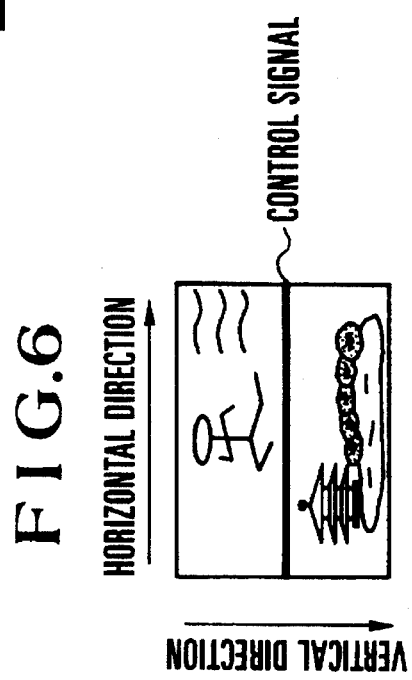

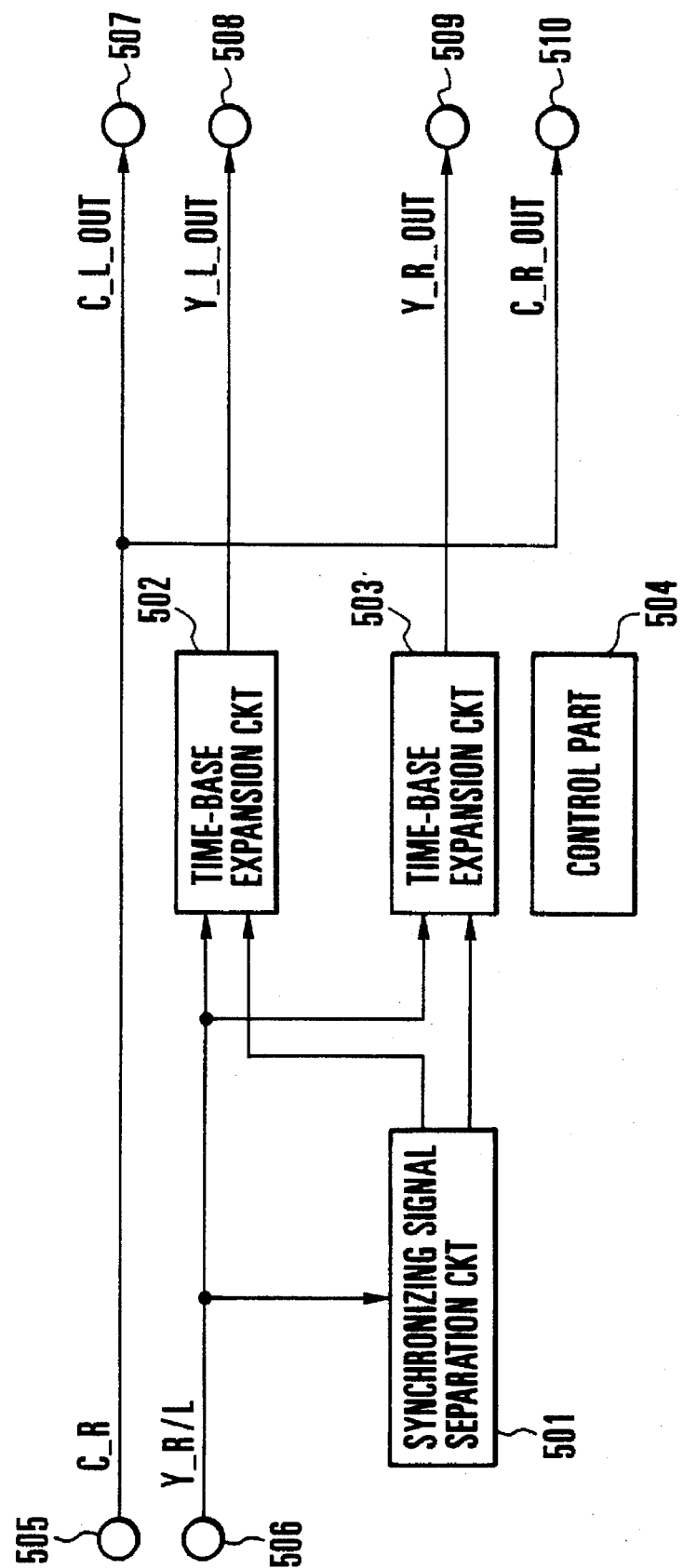

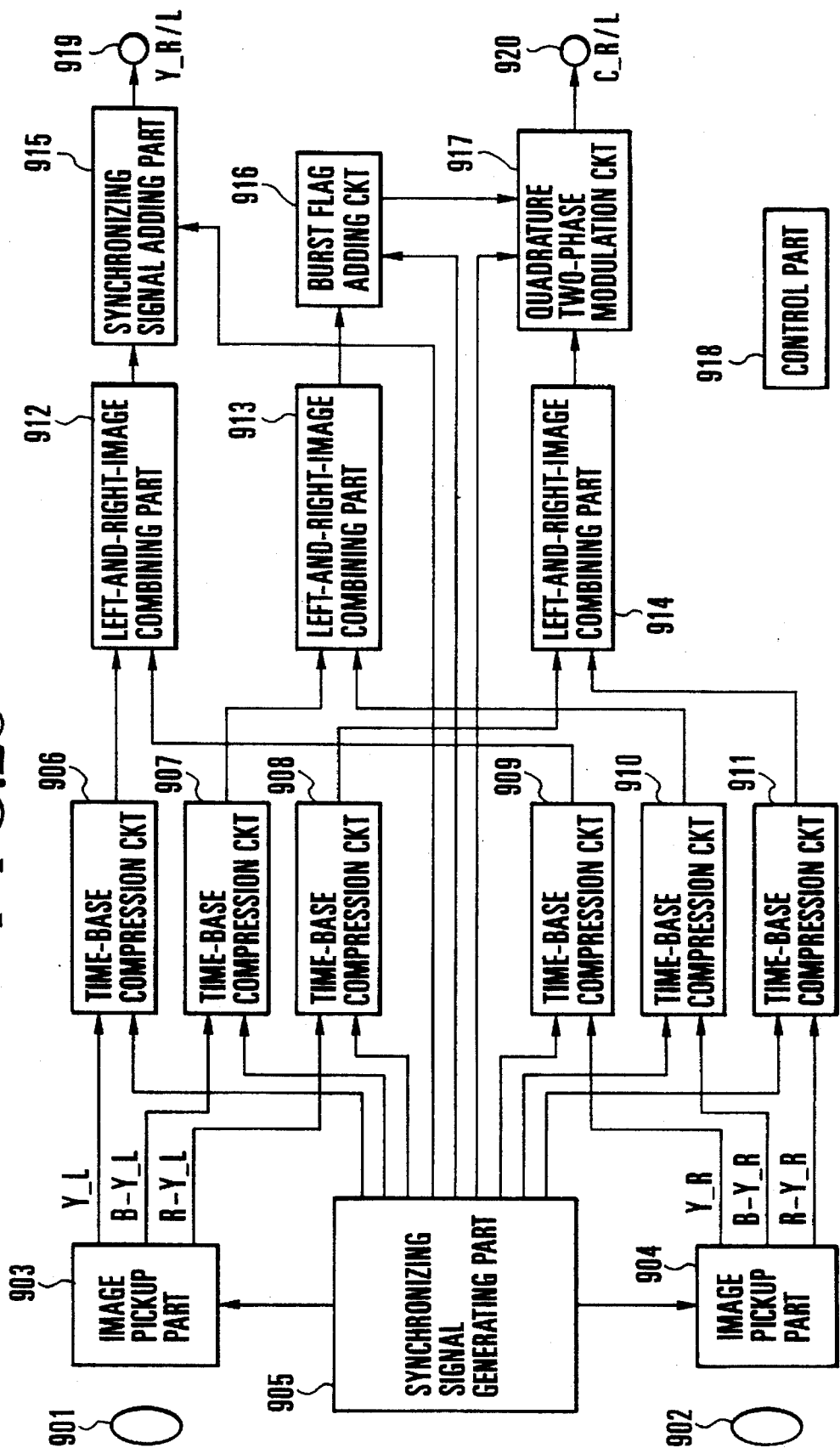

STEREOSCOPIC COMPRESSION PROCESSING WITH ADDED PHASE REFERENCE

BACKGROUND OF THE INVENTION

1. Field of the Invention

This invention relates to a stereoscopic image processing apparatus arranged to record on a recording medium a stereoscopic image signal corresponding to a stereoscopic image which is composed of, for example, left and right images or to reproduce from the recording medium and display the stereoscopic image thus recorded.

2. Description of the Related Art

FIG. 1 roughly shows the essential parts of the conventional TV system. Referring to FIG. 1, the system includes an antenna 46 which is provided for receiving image information sent from various broadcasting stations. A video tape recorder (VTR) 47 is arranged to receive the image information through the antenna 46 and to record the image information on a video tape.

Further, in reproducing and displaying the image information, the VTR 47 reads out from the video tape a desired part of the image information. The image information read out is sent to a TV monitor 48 to output images and sounds relative to them from the TV monitor 48.

The number of programs of image information has rapidly increased during recent years. The method for supplying these programs also has been diversified to include ground broadcasting, satellite broadcasting, cable broadcasting, etc. As a result, the number of programs concurrently available has increased.

The kinds of image information recording media also have increased to include optical disks, etc., besides video tapes. These recording media have come to permit recording images at a high degree of definition over a long period of time. For example, some of the VTRs of the NTSC system has, in addition to a standard mode, a triple mode in which image information can be recorded and reproduced over a length of time which is three times as long as the recordable length in the standard mode.

Meanwhile, a stereoscopic image display apparatus for viewing a stereoscopic image has been contrived with a parallax between two eyes utilized for giving a vividly lifelike image. A method for making a stereoscopic image viewable with this stereoscopic image display is as follows: An image is picked up, for example, by arranging two image pickup systems by separating their optical axes as much as a distance corresponding to a distance between the left and right eyes of the viewer (a parallax or a base length). The two images thus obtained from the two image pickup systems (hereinafter referred to as images with a parallax), i.e., the image for the right eye, and the image for the left eye are linearly polarized in different directions. These images are then compositely displayed by utilizing the differently polarized state. The viewer sees the images individually with right and left eyes by using polarizing filter spectacles.

According to another method, the stereoscopic image display apparatus is arranged to operate as follows: An image for the right eye and an image for the left eye are displayed in a time sharing manner. In viewing the display, time-division shutter spectacles are used in synchronism with the display of the images to see them individually with the right and left eyes.

FIG. 2 shows in outline the essential parts of a stereoscopic image display apparatus arranged to be used by the viewer by mounting it on a helmet or goggles. The illustration includes a liquid crystal display 49 for the left eye and a liquid crystal display 50 for the right eye. As mentioned above, images which are obtained in the above-stated manner respectively for the left and right eyes 33 and 34 of the viewer are displayed.

The liquid crystal displays 49 and 50 are illuminated from behind by a back light 22, and images displayed on them are individually viewed respectively by the left and right eyes 33 and 34 through reflection mirrors 51 and 52 and lenses 53 and 54.

The performance of the VTRs of the kind used as shown in FIG. 1 has advanced both in image quality and in the length of recordable time. As a result, they have come to use recording media of varied kinds. However, no VTR has been arranged to be capable of simultaneously. recording a plurality of items of image information. Hence, while the number of broadcast programs available at the same time has increased, no VTR has been capable of simultaneously recording a plurality of programs.

Meanwhile, the stereoscopic image display apparatus of the kind using the polarizing filter spectacles has presented a problem in that the feeling of stereoscopy is impaired when the viewer's face is tilted.

In the case of the stereoscopic image display apparatus of the kind using the time-division spectacles, on the other hand, the arrangement to alternately display the left and right images has caused a disagreeable feeling due to flickers.

Further, the stereoscopic image display apparatus which is shown in FIG. 2 has necessitated to display the images for the left and right eyes respectively on the two liquid crystal displays 49 and 50 in synchronism with each other. This requirement results in a complex display control circuit. Besides, the apparatus for recording the stereoscopic images also requires a complex arrangement.

Among the known stereoscopic image recording and reproducing apparatuses arranged to record on a recording medium a stereoscopic image signal for a stereoscopic image which is composed of left and right images and to reproduce the stereoscopic image signal from the recording medium, some apparatuses are arranged to record on a recording medium two-channel image signals outputted respectively from two video cameras as a one-channel stereoscopic image signal and reproduce the stereoscopic image signal from the recording medium.

The stereoscopic image recording and reproducing arrangement of the conventional apparatus mentioned above is as follows: In recording, image signals of n channels picked up by an n number of video cameras (n: an integer which is at least two) are respectively compressed to 1/n in the direction of a time base. The compressed image signals are time-divisionally multiplexed into a one-channel stereoscopic image signal before recording on a recording medium. In reproduction, the image signals time-divisionally multiplexed and time-base-compressed to 1/n are reproduced from the recording medium and separated from each other. After that, they are time-base-expanded by n times to restore them to the n-channel image signals.

In the conventional stereoscopic image recording and reproducing apparatus which is arranged as mentioned above, the time base of each of image signals of plural channels is compressed. After that, the image signals are time-divisionally multiplexed and recorded on a recording medium in the form of a one-channel stereoscopic image signal. At the time of reproduction, the reproduced stereoscopic image signal is time-base-expanded to bring it back into the original plural-channel image signals. However, in the event of time base variations such as jitters, for example, a time base variation component is also enlarged by n times in the same manner as the image signal to distort a reproduced image.

The adverse effect of the above-stated time base variations on the reproduced image conspicuously appears particularly in the luminance component of the image signal. Vertical lines in an image, such as the window sashes, the contour, etc., of a building, should be expressed in straight lines. However, in the event of occurrence of time base variations in the recording and reproducing systems, these lines are expressed as bent lines. Particularly, in the case of the conventional stereoscopic image recording and reproducing apparatus described above, the arrangement of expanding the reproduced stereoscopic image by n times in the direction of time base causes the time base variation component to be also expanded by n times. As a result, the degree to which the image is distorted is enlarged also by n times to further the image distortion.

FIG. 3 shows the states of signals and images on display obtained in the event of occurrence of time base variations when a stereoscopic image signal which is composed of an image signal for a left image and an image signal for a right image is recorded and reproduced on and from a recording medium by the conventional stereoscopic image recording and reproducing apparatus, which has been arranged in the manner described above.

In FIG. 3, a part (f) shows a one-channel stereoscopic image signal obtained by time-divisionally multiplexing the image signals of two left and right channels which are time-base-compressed to ½. In the part (f), reference symbol "l" denotes a signal for the left image and a symbol "r" a signal for the right image. A part (g) shows the time-base-compressed image signals of the part (f) in a state of being displayed on a display device such as a CRT. Parts (h), (i) and (j) show the time-base-compressed image signals of the part (f) in such states that are obtained when time base variations take place in a recording and reproducing system in recording and reproducing them on or from a recording medium with a recording and reproducing apparatus such as a VTR or the like. When time base variations take place in the recording and reproducing system, the adverse effect of the time base variations is relatively small on the left image which is near to a horizontal synchronizing signal, as shown in the parts (i) and (j). However, the adverse effect is quite salient on the right image and is about two times as great as the effect on the left image.

Further, while the adverse effect of time base variations on the luminance component of the image signal are as described above, the time base variations also have the n times multiplied adverse effect as variations in hue on the chrominance component of the image signal in the same manner as on the luminance component. The time base variations thus make it hardly possible to carry out a demodulation process with correct hue, and thus result in uneven colors of an image displayed.

SUMMARY OF THE INVENTION

It is a general object of this invention to provide a stereoscopic image processing apparatus which is arranged to be capable of solving the problems of the prior art described in the foregoing.

It is a more specific object of this invention to provide a stereoscopic image processing apparatus which is arranged to combine a plurality of image signals corresponding to a plurality of images and to be capable of transmitting the combined image signals together with information which is not image information but corresponds to the contents of the plurality of images.

Under this object, a stereoscopic image processing apparatus arranged according to this invention to process a stereoscopic image signal for a stereoscopic image which is composed of a plurality of images includes time base compressing means arranged to receive a plurality of image signals corresponding to the plurality of images, to time-base-compress each of the image signals received and to output the time-base-compressed image signals, information signal generating means for generating an information signal which is not an image signal but corresponds to contents of the plurality of images, and output means arranged to multiplex the information signal generated by the information signal generating means with a composite image signal formed by combining the plurality of time-base-compressed image signals outputted from the time base compressing means and to output the multiplexed signals to a transmission route.

It is another object of this invention to provide a stereoscopic image processing apparatus arranged to combine a plurality of image signals corresponding to a plurality of images and to be capable of recording the combined image signals on a recording medium together with information which is not image information but corresponds to contents of the plurality of images.

Under that object, a stereoscopic image processing apparatus arranged according to this invention to record on a recording medium a stereoscopic image signal for a stereoscopic image which is composed of a plurality of images includes image signal generating means for generating a plurality of image signals which respectively correspond to the plurality of images, time base compressing means arranged to receive the plurality of image signals generated by the image signal generating means, to time-base-compress each of the plurality of signals received and to output the time-base-compressed image signals, information signal generating means for generating an information signal for information other than images obtained when the plurality of image signals are generated by the image signal generating means, and recording means arranged to multiplex the information signal generated by the information signal generating means with a composite image signal formed by combining the plurality of image signals time-base-compressed by the time base compressing means.

It is a further object of this invention to provide a stereoscopic image processing apparatus which is capable of recording a stereoscopic image signal on a recording medium in such a manner that, at the time of reproduction, the adverse effect of a time base variation component generated at a recording and reproducing system can be mitigated to enable the stereoscopic image signal to be adequately reproduced from the recording medium.

Under the above-stated object, a stereoscopic image processing apparatus arranged according to this invention to record on a recording medium a stereoscopic image signal for a stereoscopic image which is composed of left and right images includes time base compressing means arranged to time-base-compress and output image signals corresponding respectively to the left and right images for every horizontal scanning period, image signal combining means for combining and outputting the image signals which correspond to the left and right images and are time-base-compressed by the time base compressing means by providing a predetermined blanking period within every horizontal scanning period in such a way as to have the image signals located across the blanking period in the direction of the time base, signal adding means for adding, during the blanking period provided between the time-base-compressed and combined image signals which correspond to the left and right images and are outputted from the image signal combining means, a signal to be used as phase reference at the time of reproduction to the image signals and for outputting the added signals, and recording means for recording on the recording medium the signals outputted from the signal adding means.

It is a still further object of this invention to provide a stereoscopic image processing apparatus which is arranged to record on a recording medium a stereoscopic image signal for a stereoscopic image and, at the time of reproduction, to be capable of adequately reproducing the stereoscopic image signal by mitigating the adverse effect of a time base variation component generated at a recording and reproducing system.

Under the above-stated object, a stereoscopic image processing apparatus arranged according to this invention to reproduce a stereoscopic image signal from a recording medium on which the stereoscopic image signal for a stereoscopic image which is composed of left and right images is recorded includes reproducing means for reproducing and outputting the stereoscopic image signal recorded on the recording medium, time base expanding means arranged to separate, from the signal outputted from the reproducing means, image signals which correspond respectively to left and right images and have been time-base-compressed for every horizontal scanning period, to time-base-expand the image signals corresponding to the left and right images and to output respectively the time-base-expanded image signals, and control means arranged to extract, from the signal outputted from the reproducing means, a phase reference signal added for reproduction between the image signals which correspond to the left and right images and combined with each other in a state of being time-base-compressed respectively for every horizontal scanning period and to control a time base expanding process of the time base expanding means by using the phase reference signal.

These and further objects and features of this invention will become apparent from the following detailed description of embodiments thereof taken in connection with the accompanying drawings.

BRIEF DESCRIPTION OF THE DRAWINGS

FIG. 5 is a block diagram showing in outline the essential parts of a plural-image reproducing apparatus arranged also as the first embodiment of this invention.

FIG. 6 shows a composite image obtained by the plural-image reproducing apparatus arranged as the first embodiment of this invention.

FIG. 16 is a block diagram showing in detail the arrangement of a reproduction process part of FIG. 12.

FIG. 20 is a block diagram showing in detail the arrangement of image pickup and processing parts of the third embodiment of this invention.

DETAILED DESCRIPTION OF THE PREFERRED EMBODIMENTS

Figure 4:
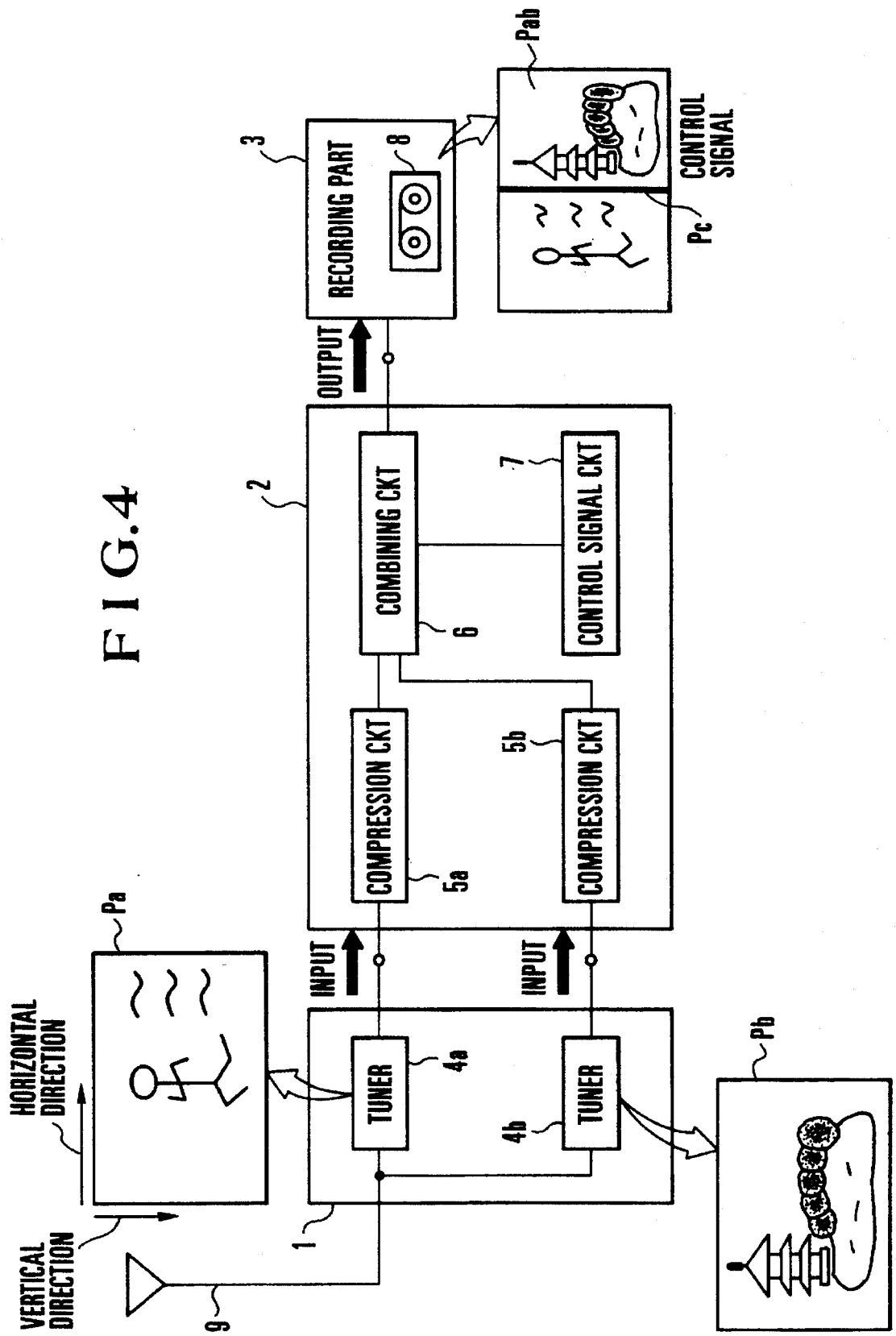
FIG. 4 is a block diagram showing in outline the essential parts of a plural-image recording apparatus arranged as a first embodiment of this invention.

FIG. 4 shows in a block diagram the arrangement of essential parts of a plural-image recording apparatus of a first embodiment of this invention. The illustration includes an input part 1. The input part 1 consists of tuners 4a and 4b each of which is arranged to receive TV broadcast programs as desired through an antenna 9, or an optical cable which is not shown.

The TV programs include image information and sound information and are supplied by ground broadcasting, satellite broadcasting, optical cable broadcasting, etc. The image information consists of motion images which are transmitted approximately at a rate of scores of images (frames) per sec. In FIG. 4, each of reference symbols Pa and Pb denotes one of images transmitted through the image information. A compressing and combining part 2 is arranged to compress a plurality of items of image information from the input part 1 at compression circuits 5a and 5b, for example, by varying a sampling frequency to be used in reading out image information temporarily stored in frame buffers. A combining circuit 6 in the part 2 combines the compressed image information and a control signal obtained from a control signal circuit 7 and outputs composite image information.

A recording part 3 is arranged to record the composite image information from the compressing and combining part 2 on a recording medium 8 which is, for example, a video tape. A reference symbol Pab denotes one of a series of images transmitted through the composite image information (hereinafter referred to as a composite image). The composite image is composed of a reduced image of the image Pa which is located on the left side and a reduced image of the image Pb which is located on the right side of the composite image. A reference symbol Pc denotes a control signal (a separating zone signal). The control signal Pc corresponds to an index to be used, for example, in separating the reduced images.

This embodiment is thus arranged to input the image information from the two tuners 4a and 4b of the input part 1 to the compressing and combining part 2, to compress the image information inputs respectively by the compression circuits 5a and 5b in such a way as to cause the horizontal length of each of the images Pa and Pb of the image information to be compressed to ½ of them. The compressed image information and the control signal Pc from the control signal circuit 7 are combined into the composite image information. Then, the composite image information is recorded on the recording medium 8 by the recording part 3.

The details of the image processing manner in which the image information signals are compressed and combined by the compressing and combining part 2 are as follows: The image information signals inputted to the compressing and combining part 2 are temporarily written into frame buffers or line memories or the like. Then, only necessary picture element signals are read out for every one line according to the rate of compression (½ in the case of this embodiment). The picture element signals thus read out are transferred to the combining circuit 6.

At the combining circuit 6, a combining process is carried out in the order of the compressed image Pa, the control signal Pc and the compressed image Pb to combine them into one line amount of the composite image information. This process is repeated to serially obtain the composite image information for lines one after another. As a result, a composite image information signal representing an image including a plurality of images such as an image Pab is obtained.

The composite image information signal is in conformity with the conventional TV system, so that it is recordable on a tape- or disk-shaped recording medium.

Meanwhile, sound information is recorded also in conformity with the conventional TV system. For example, sounds related to the image information are recorded in a voice-grade channel and a subvoice-grade channel.

The control signal Pc of this embodiment is prepared according to the image information signals to be combined. In a case where an N number of reduced images are to be combined into an image by horizontally aligning them, for example, the horizontal length of each of the images is reduced to 1/N before they are horizontally aligned and then a strip-like control signal is added between the reduced images. As a result, the composite image thus obtained includes an N-1 number of such control signals.

Further, the image reducing direction may be a vertical direction, as shown in FIG. 6, instead of the horizontal direction. In the case of such modification, the control signal is prepared to have the strip-like shape extending in the horizontal direction. Further, the manner in which the reduced images are aligned may be variously changed. For example, a plurality of reduced images may be two-dimensionally aligned within one composite image.

The method of forming the reduced images by compressing them may be replaced with any other method whereby reduced images are not formed as long as composite image information is obtainable by combining image information signals with a control signal.

While this embodiment is arranged to combine the control signal in a composite image, that arrangement may be changed to record the control signal within some other area (an H/V blanking area, etc.) such as an area to be used for teletext broadcasting. The control signal may be arranged to include not only information on a composite image number and a compressing method but also information on a channel number, broadcasting time, etc.

The arrangement of this embodiment makes it possible to concurrently record different TV programs on one and the same recording medium.

FIG. 5 shows in outline the arrangement of a plural-image reproducing apparatus 20 included in the first embodiment. The plural-image reproducing apparatus 20 of this embodiment includes a reading part 11, a separating and expanding part 10, etc. The plural-image reproducing apparatus 20 is arranged to reproduce a plurality of TV programs recorded on the recording medium 8 by the plural-image recording apparatus of the embodiment. The TV programs reproduced are outputted and supplied to a display part (TV monitor) 15.

The display part 15 is arranged to display image information coming from the separating and expanding part 10. The display part 15 may be arranged to include two monitors to have different images displayed by them.

The separating and expanding part 10 first detects the control signal or control signals included in the composite image information. If there are an N-1 number of control signals in the vertical direction within an input image, this indicates that image information on N images are combined in a state of being reduced to an 1/N size in the horizontal direction. Then, a separation circuit 13 separates the image by using the control signal Pc or a horizontal synchronizing signal as an index. The outputs of the separation circuit 13 are expanded by N times in the horizontal direction by expansion circuits 14-1 to 14-n. As a result, N image information signals are outputted from the separating and expanding part 10.

In the case of this embodiment, a composite image information signal from the reading part 11 is separated into two compressed image information signals by the separation circuit 13. The image information signals outputted from the separation circuit 13 are expanded respectively by the expansion circuits 14-1 and 14-2 and are selectively supplied to the display part 15. This arrangement may be changed to use two TV monitors to have the images displayed respectively on the two TV monitors.

According to the above-state arrangement of this embodiment, a plurality of TV programs can be concurrently obtained from the composite image information.

While this embodiment is arranged to carry out the separating and expanding actions on the composite image information on the basis of the control signal, this arrangement may be changed to carry out the separating and expanding actions on the basis of predetermined conditions without having recourse to the control signal.

Figure 7:
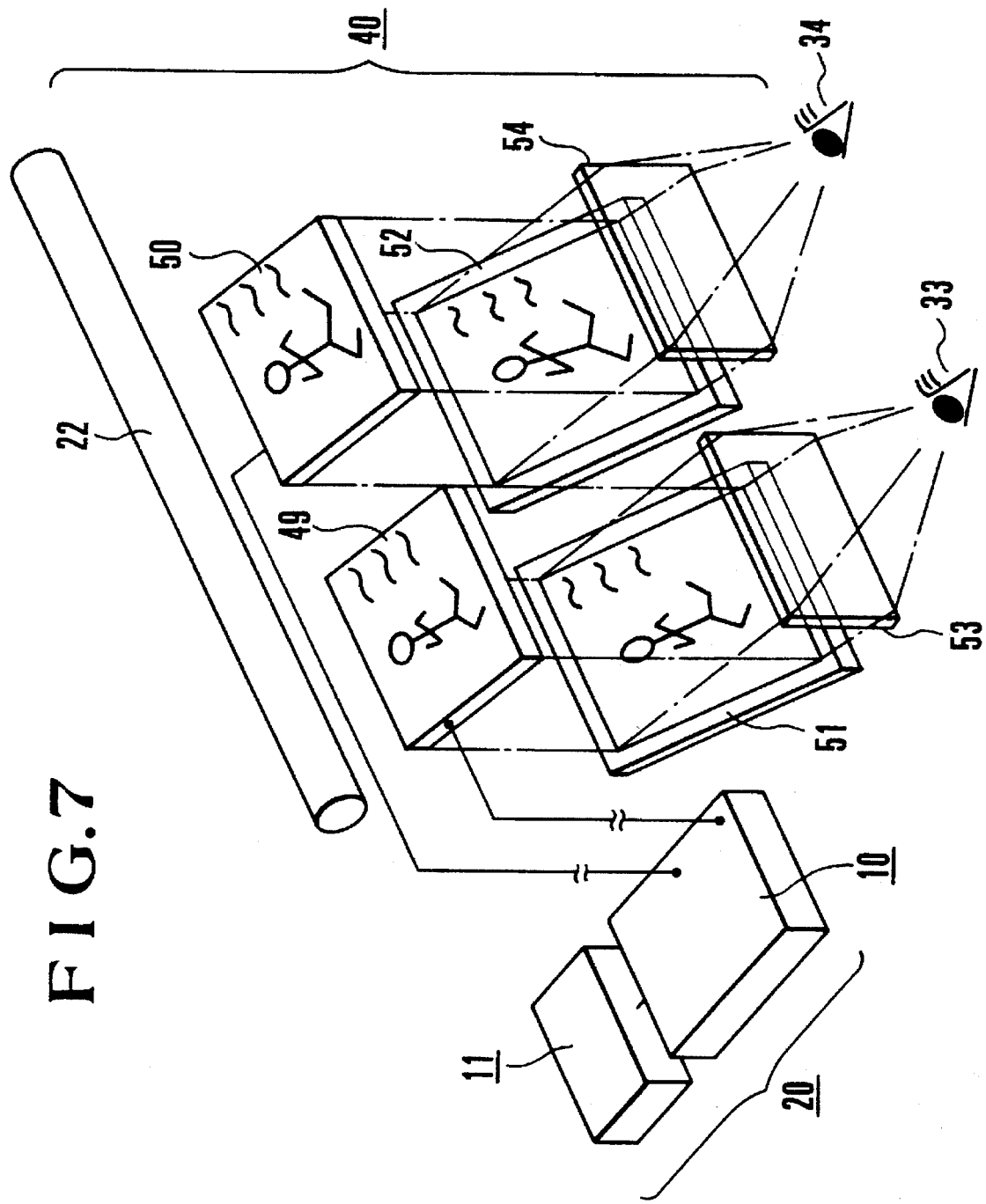
FIG. 7 schematically shows the essential parts of image display means arranged in the first embodiment as a first example of arrangement of them.

FIG. 7 schematically shows a first example of arrangement of essential parts of the image display apparatus included in the first embodiment. Referring to FIG. 7, the plural-image reproducing apparatus 20 is arranged in about the same manner as in the case of FIG. 5. In the plural-image reproducing apparatus, the composite image information recorded on the recording medium is read out by the reading part 11. The composite image information is then supplied to the separating and expanding part 10 to be separated and expanded. As a result, two items of image information (or two stereoscopic image information signals) are outputted from the part 10.

The two images carried by the image information signals coming from the plural-image reproducing apparatus 20 are displayed respectively by a liquid crystal display 49 for the left eye and a liquid crystal display 50 for the right eye. The images displayed on the liquid crystal displays 49 and 50 are illuminated from behind by a back light 22 and are led respectively to the left and right eyes 33 and 34 through reflection mirrors 51 and 52 and lenses 53 and 54.

The liquid crystal displays 49 and 50, the reflection mirrors 51 and 52 and the lenses 53 and 54 jointly form a display part 40. The display part 40 is a so-called head mount display which is to be mounted on a helmet, goggles or the like and arranged to be attached to a head part of the viewer.

In the case of this embodiment, the images which are reproduced with a parallax between them by the plural-image reproducing apparatus 20 are guided to the left and right eyes of a viewer through the display part 40 to enable the viewer to see a stereoscopic image.

Figure 8A:
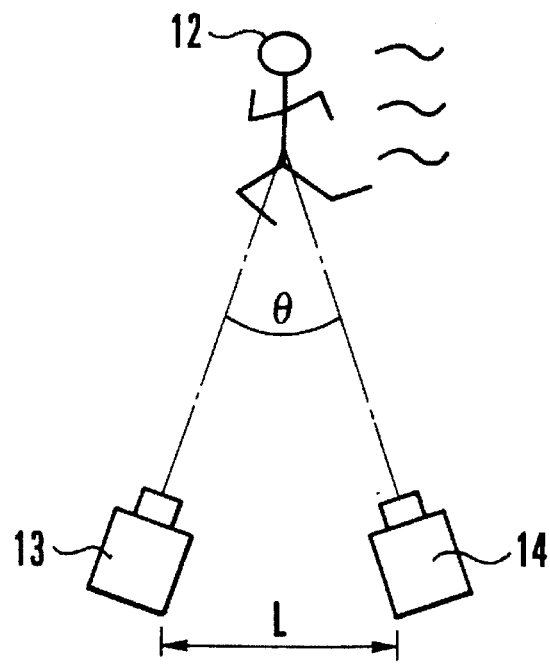
FIGS. 8(A) and 8(B) show shooting conditions and how a composite image is obtained.

The images with a parallax are described below with reference to FIGS. 8(A) and 8(B):

FIG. 8(A) shows shooting conditions. FIG. 8(B) shows how the two picked-up images carried by the image information signals are combined. FIG. 8(A) shows an object of shooting 12 and TV cameras 13 and 14. The two TV cameras 13 and 14 are spaced a predetermined distance L and are arranged to pick up the image of one and the same object 12. The arrangement gives two images having a so-called parallax which corresponds to a difference between images as seen by the left and right eyes when the viewer actually views the object 12. In this case, the distance L, a convergence angle $\ominus$ defined by the two TV cameras 13 and 14 and the object 12, etc., become important parameters for control over the stereoscopic feeling of the viewer.

Figure 8B:
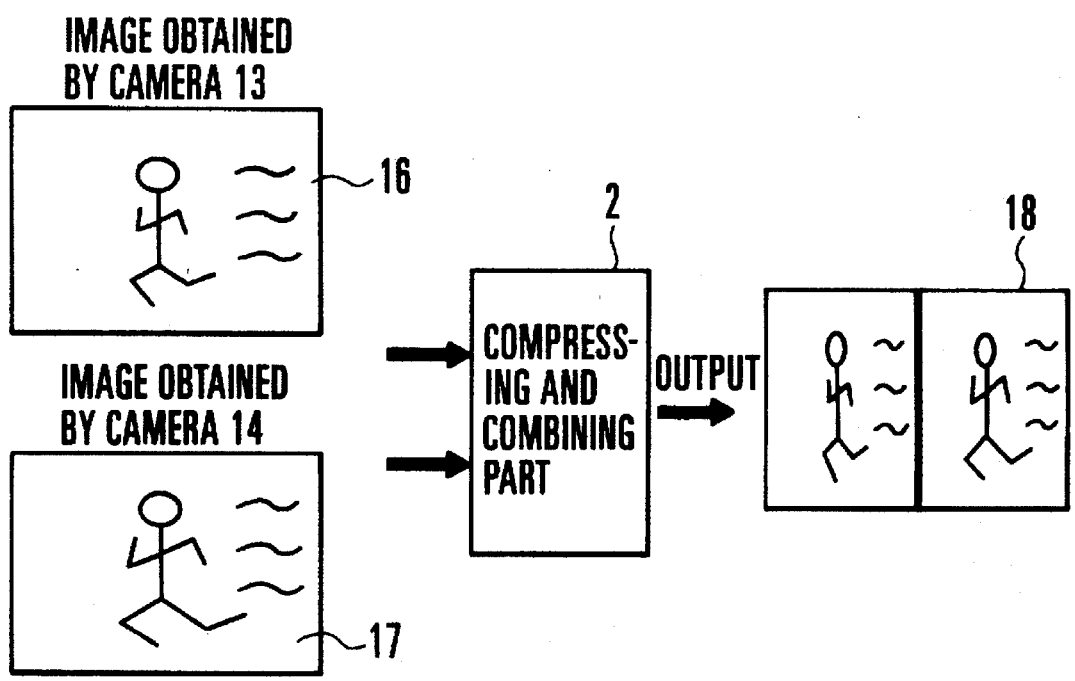

FIG. 8(B) shows two images 16 and 17 included in series of images picked up by the TV cameras 13 and 14. The two images 16 and 17 are combined by the compressing and combining part 2 together with the control signal Pc to obtain a composite image 18. The composite image 18 is recorded on a recording medium 8.

Meanwhile, sound information is recorded in two channels in the same manner as the conventional method without compressing the sound information.

The arrangement of the image display apparatus of this embodiment permits control over the stereoscopic feeling of the viewer and the aspect ratio (a ratio between the horizontal and vertical lengths) of the image by changing the recording conditions of the apparatus.

For example, the stereoscopic feeling can be emphasized by lengthening the distance between the TV cameras 13 and 14 and shortening a distance to the object to increase the convergence angle $\ominus$. Conversely, the image impression can be flattened with the convergence angle $\ominus$ decreased by increasing the object distance.

The aspect ratio as felt by the viewer also can be changed by changing the position of the object within the image picked up by the two TV cameras.

In the case of FIG. 8(A), the object 12 is located approximately in the middle of the images 16 and 17. The two TV cameras 13 and 14 are shooting about the same range of shooting. In shooting and recording, if the shooting ranges of these cameras are shifted from each other by moving the optical axis of the TV camera 13 to cause the object 12 to deviate to the right in the image 16 for the left eye and that of the TV camera 14 to cause the object 12 to deviate to the left in the image 17 for the right eye, the two images reproduced and presented to the left and right eyes of the viewer give an image which is seen by the viewer in a shape which is longer in the horizontal direction than the image normally obtained and is thus seen as a so-called panorama image.

Further, in displaying the image information recorded in the above-stated manner, the advantage of the embodiment can be more effectively enhanced by adjusting paths leading to the eyes of the viewer in such a way as to control an angle formed by the sighting lines of the left and right eyes (hereinafter referred to as a convergence angle $\ominus'$), which corresponds to the convergence angle $\ominus$ shown in FIG. 8(A).

In the case of this embodiment, the distance between the cameras 13 and 14, the convergence angle $\ominus$, the positions of the object within the images, etc., are recorded as the control signal Pc. In reproducing and displaying the composite image information, an angle defined by the left and right eyes and the image displayed on the display part are controlled on the basis of the control signal Pc. Further, while this embodiment is arranged to include the control signal Pc in the composite image, the arrangement may be changed to record the control signal Pc, for example, within an area provided for recording teletext information.

According to the arrangement of this embodiment, images with a parallax can be reproduced and displayed without any arrangement for synchronizing the two images and an adequate stereoscopic feeling can be attained without recourse to a complex control device.

The embodiment also eliminates the shortcomings of the convention apparatus presenting the problems that the stereoscopic feeling is impaired when the face is tilted and that the flickers of the time-division shutter cause a disagreeable feeling.

Figure 9:
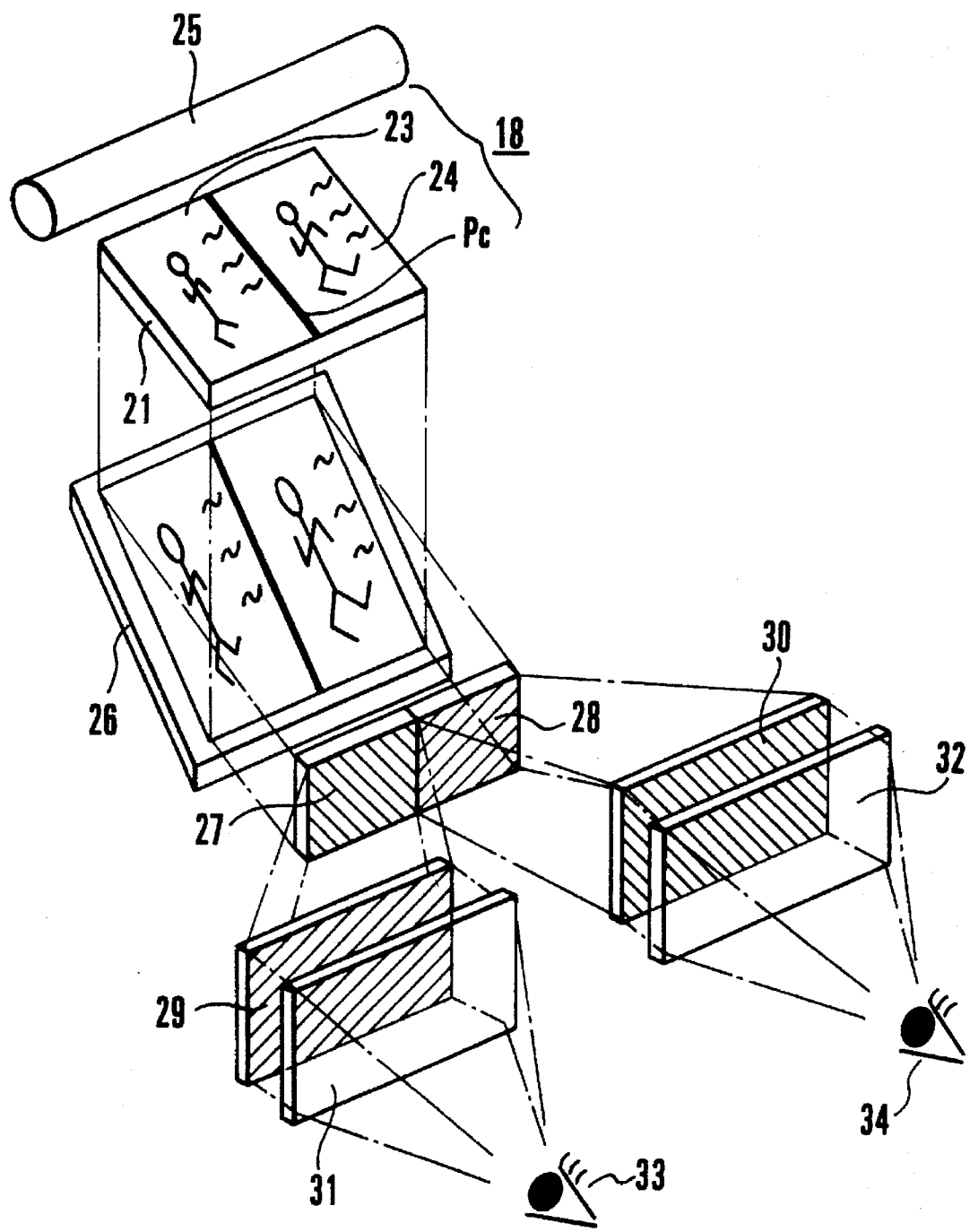
FIG. 9 schematically shows the essential parts of the image display means arranged in the first embodiment as a second example of arrangement of them.

FIG. 9 shows a second example of arrangement of the image display apparatus included in the first embodiment. In FIG. 9, a display part 21 (a liquid crystal display) displays a composite image 18. The composite image 18 is composed of reduced images 23 and 24 obtained by reducing to half the sizes of the images 16 and 17 having a parallax as shown in FIG. 8(B) and the control signal Pc.

The reduced image 23 is for the left eye and the reduced image 24 for the right eye. The control signal Pc in which shooting conditions, etc., are recorded is in the form of a black level signal having a predetermined width and serves to prevent a crosstalk. Deflecting and partial-magnifying optical elements 27 and 28 consist of cylindrical lenses and prisms and are arranged to partially magnify approximately two times the reduced images 23 and 24 in the horizontal direction of them and also to optically separate them by horizontally deflecting them away from each other.

In the case of this embodiment, the reduced images 23 and 24 on the liquid crystal display part 21 which is illuminated from behind by a back light 25 are first reflected by a reflection mirror 26 to cause them to be incident on the deflecting and partial-magnifying optical elements 27 and 28. At the optical elements 27 and 28, the reduced images 23 and 24 are partially magnified and separated from each other while being horizontally deflected. Then, the reduced images 23 and 24 are further deflected by deflecting optical elements 29 and 30 and guided to the left and right eyes 33 and 34 through lenses 31 and 32.

The reduced images 23 and 24 are thus brought back to the same aspect ratio that is obtained at the time of shooting and are seen as a stereoscopic image.

Further, in the case of this embodiment, the convergence angle $\Theta'$ is variable to adjust a stereoscopic feeling or a panoramic feeling for an optimum viewing state either by varying the degree of parallelism of the deflecting and partial-magnifying optical elements 27 and 28 with respect to the deflecting optical elements 29 and 30 or by shifting the lenses 31 and 32 in parallel on the basis of the control signal Pc.

In a case where no information on the conditions adopted at the time of shooting is recorded, the convergence angle $\Theta'$ is set either at a standard angle or at an angle desired by the viewer. The angle of course may be set at a desired angle even in a case where the information on shooting conditions is not recorded.

Further, it is possible, if so desired, to view an image in an ordinary state instead of in a stereoscopic state with this embodiment by forming the composite image information with images having no parallax between them.

Figure 10:
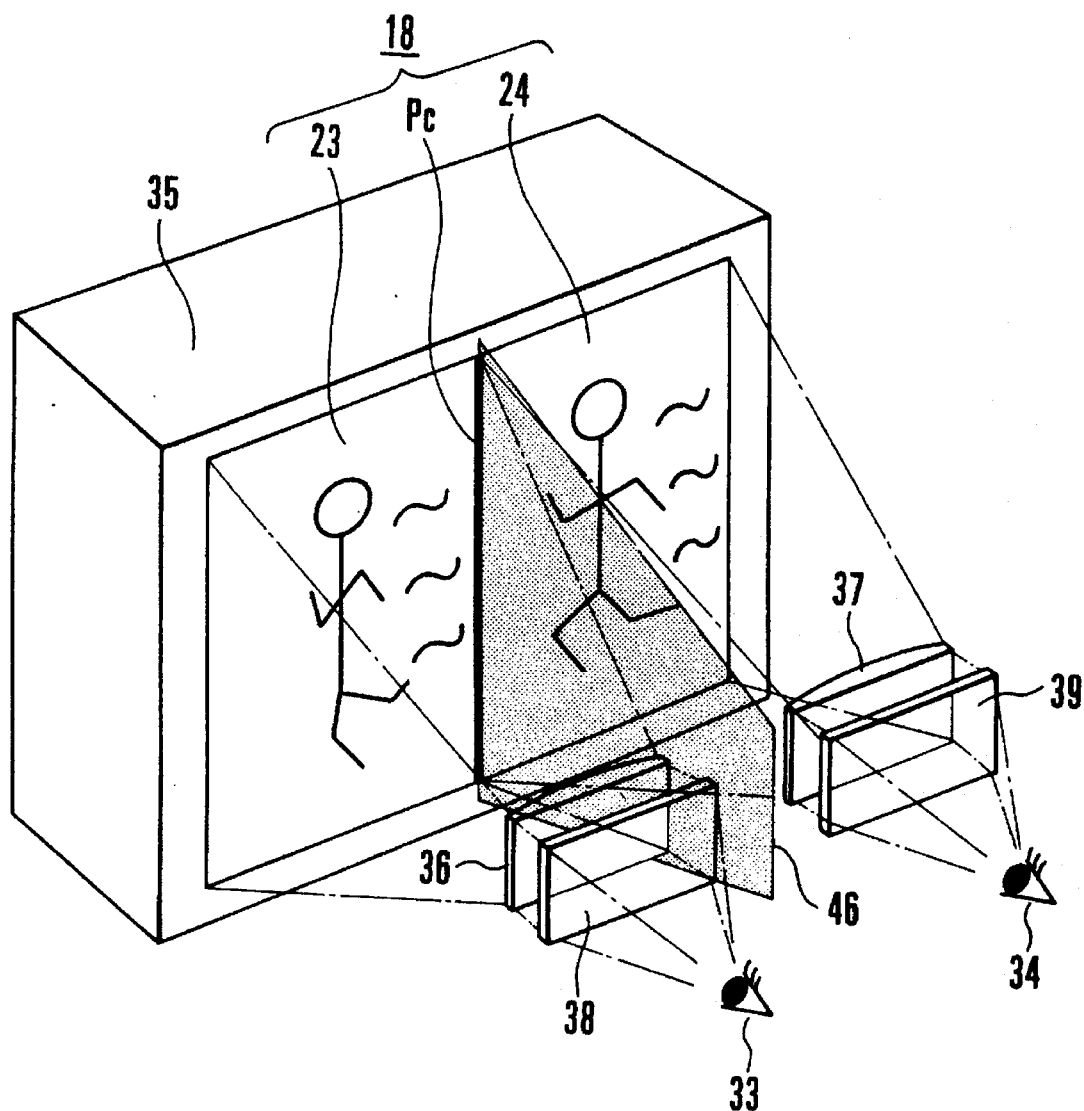
FIG. 10 schematically shows the essential parts of the image display means arranged in the first embodiment as a third example of arrangement of them.

FIG. 10 schematically shows as a third example of arrangement of essential parts of the image display apparatus employed in the first embodiment of this invention. In the case of this example, a composite image is arranged to be viewed by using the composite image 18 of FIG. 8.

Referring to FIG. 10, the composite image 18 is displayed on a TV monitor 35. The reduced images 23 and 24 are horizontally enlarged by two times by cylindrical lenses 36 and 37 to bring the aspect ratio of them back to the aspect ratio of the original images (the images 16 and 17 shown in FIG. 8). Reference numerals 38 and 39 denote lenses. A light blocking plate 46 is provided for preventing a crosstalk.

In the case of this example, the reduced images 23 and 24 displayed on the TV monitor 35 are partially magnified by the cylindrical lenses 36 and 37 before they are guided to the left and right eyes 33 and 34 through the lenses 38 and 39. The stereoscopic feeling or the panoramic feeling is controlled by varying the convergence angle $\Theta'$ with the cylindrical lenses 36 and 37 and the lenses 38 and 39 moved in parallel to each other in the direction corresponding to the horizontal (or transverse) direction of the images 23 and 24.

Figure 11:
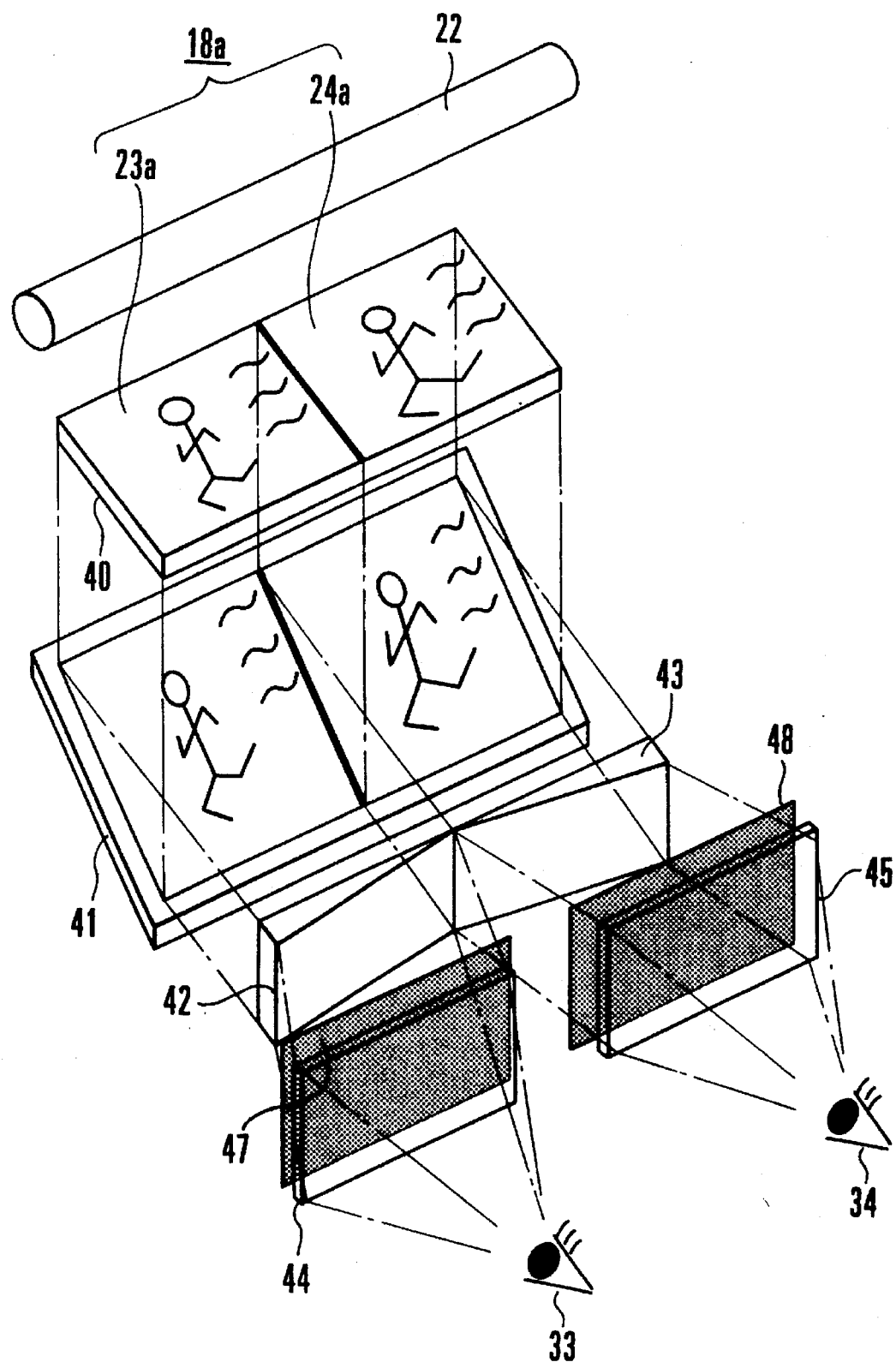
FIG. 11 schematically shows the essential parts of the image display means arranged in the first embodiment as a fourth example of arrangement of them.

FIG. 11 schematically shows, as a fourth example of arrangement, the essential parts of the image display apparatus included in the first embodiment. In the case of the fourth example, a composite image is viewed also by using the composite image 18 shown in FIG. 8.

Referring to FIG. 11, a liquid crystal display 40 is arranged to display composite image information. Compared with the liquid crystal display 21 of FIG. 9, the liquid crystal display 40 has its horizontal (transverse) length arranged to be about twice as long as its vertical length (the number of picture elements is the same). In other words, a composite image 18a which is displayed on the liquid crystal display 40 has its transverse length about twice as long as that of an area used for shooting. A light source 22 is arranged to illuminate the liquid crystal display 40 from behind. A reflection plate 41 is arranged to reflect and deflect images 23a and 24a on the liquid crystal display 40 illuminated by the light source 22. Prisms 42 and 43 are arranged to deflect and separate in the horizontal direction the images 23a and 24a coming through the reflection plate 41. Analyzing filters 47 and 48 are arranged to pass only such polarized light bundles that are in the direction of orthogonally intersecting each other.

Polarizing filters are arranged within the liquid crystal display 40 in such a way as to have the polarizing directions orthogonally intersect each other for each of the areas where the images 23a and 24a are displayed. This arrangement allows the image 23a to pass the analyzing filter 47 and the image 24a to pass the analyzing filter 48 and effectively prevents the image for one eye from leaking into the image for the other eye. Lenses 44 and 45 are arranged to guide the images 23a and 24a to the left and right eyes 33 and 34 after they pass the analyzing filters 47 and 48.

In the case of the fourth example, the stereoscopic feeling, the panoramic feeling, etc., can be controlled by varying the convergence angle $\Theta'$ either by rotating the prisms 42 and 43 on an axis in a direction corresponding to the vertical direction of the images 23a and 24a or by moving the lenses 44 and 45 in a direction corresponding to the transverse direction of the images 23a and 24a.

According to the arrangement described above as the first embodiment of this invention, there are attained a plural-image combining apparatus for obtaining composite image information by compressing a plurality of image information signals and by combining them with each other together with a control signal, a plural-image recording apparatus which is arranged to be capable of concurrently recording the plurality of image information signals by recording the composite image information, and a plural-image reproducing apparatus which is arranged to reproduce the plurality of image information signals from the composite image information.

Further, an image display apparatus which permits the viewer to easily view an excellent image can be arranged in a compact size by using the above-stated composite image information and by guiding a plurality of images to the left and right eyes of the viewer.

Figure 12:
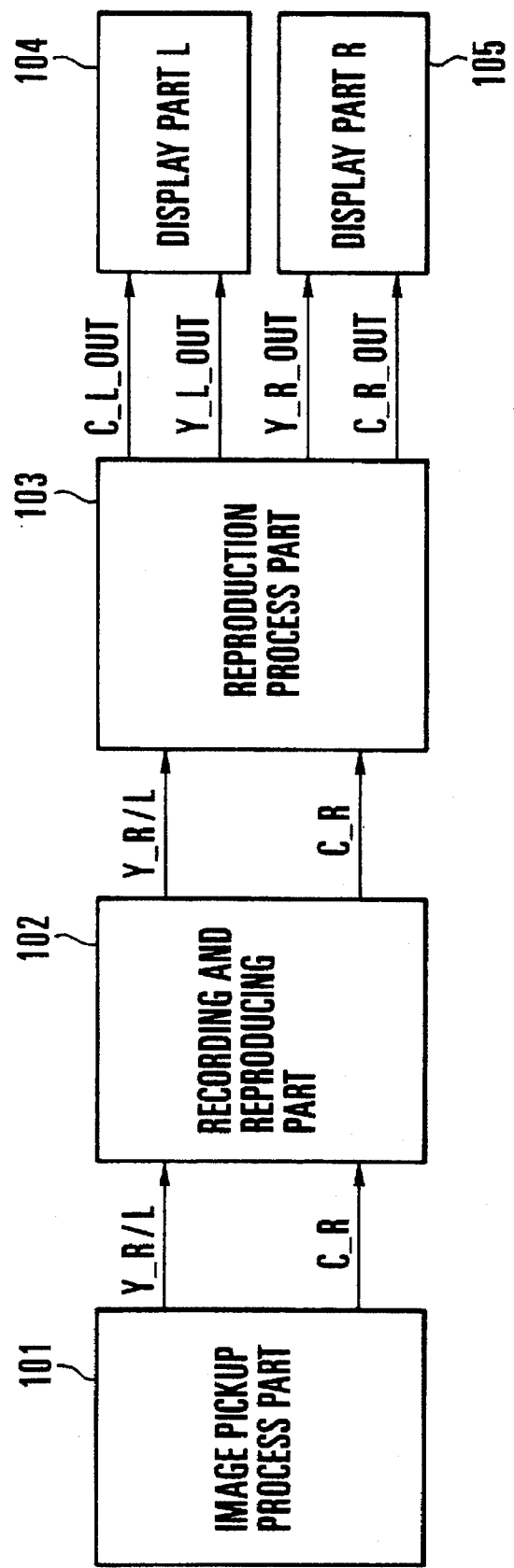
FIG. 12 is a block diagram showing in outline a stereoscopic image recording and reproducing apparatus arranged as a second embodiment of this invention.

A second embodiment of this invention is next described as follows:

FIG. 12 show in a block diagram a stereoscopic image recording and reproducing apparatus arranged as the second embodiment of this invention. Referring to FIG. 12, an image pickup process part 101 includes a photo-taking lens, an image sensor, etc. A recording and reproducing part 102 includes a recording and reproducing device such as a VTR, etc. A reproduction process part 103 is arranged to form image signals of left and right (two) channels from signals reproduced from a recording medium in the recording and reproducing part 102. Display parts 104 and 105 are arranged to display respectively the left and right images. The recording and reproducing part 102 which consists of a VTR, etc., can be arranged in conformity with the standards of any recording system, such as the VHS video system, the 8-mm video or any other analog or digital recording system. The display parts 104 and 105 can be arranged as CRTs or LCDs.

Since all of these parts 102, 104 and 105 can be arranged in the known manner, the details of their operations are omitted from the following description.

Figure 13:
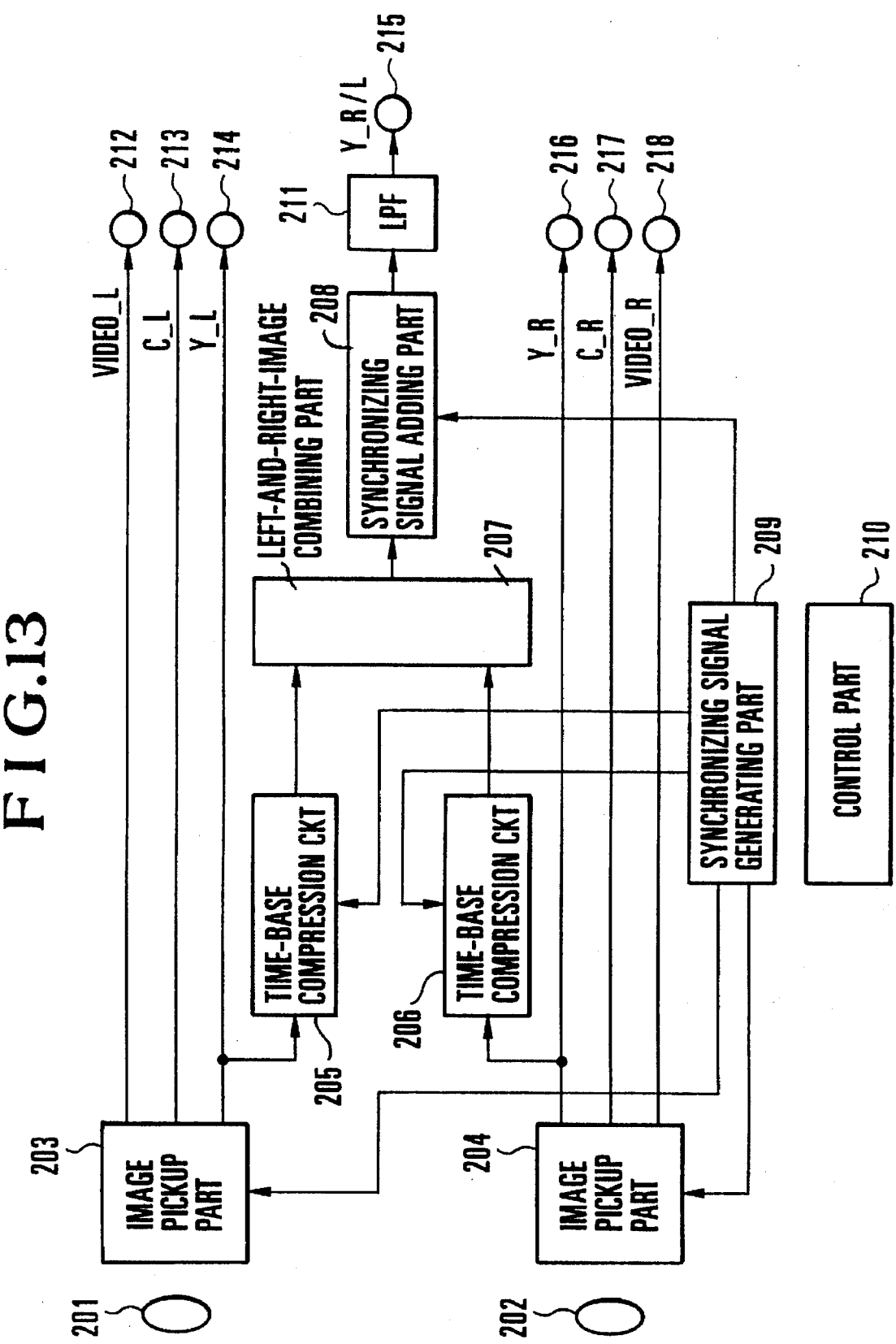
FIG. 13 is a block diagram showing the details of image pickup and processing parts of FIG. 12.

The operation of the image pickup process part 101 which is shown in FIG. 12 is described with reference to FIGS. 13, 14 and 15 as follows:

FIG. 13 shows in a block diagram the details of arrangement of the image pickup process part 101. Referring to FIG. 13, a photo-taking lens 201 is provided for left images. A photo-taking lens 202 is provided for right images. Each of image pickup parts 203 and 204 consists of an image sensor and a signal processing circuit. The recording and reproducing part 102 includes time-base compression circuits 205 and 206, a left-and-right-image combining part 207, a synchronizing signal adding part 208, a synchronizing signal generating part 209, and a control part 210 which is arranged to control the whole image pickup process part 101. While it is omitted from the illustration, the control part 210 is connected to each of the above-stated parts of the image pickup process part 101 to control their actions. An output terminal 212 is arranged to output a composite video signal VIDEO-L for the left image. An output terminal 213 is arranged to output a chrominance component signal C-L for the left image. An output terminal 214 is arranged to output a luminance component signal Y-L for the left image. An output terminal 215 is arranged to output a luminance component signal Y-R/L for a left/right composite image formed by time-division multiplexing. An output terminal 216 is arranged to output a luminance component signal Y-R for the right image. An output terminal 217 is arranged to output a chrominance component signal C-R for the right image. An output terminal 218 is arranged to output a composite video signal VIDEO-R for the right image.

In the arrangement shown in FIG. 13, the left image is formed by the photo-taking lens 201 on an image pickup plane of the image sensor disposed within the image pickup part 203. The image pickup part 203 then forms the composite video signal VIDEO-L, the luminance component signal Y-L and the chrominance component signal C-L. These signals are outputted from the output terminals 212, 213 and 214, respectively. The processes performed by the image pickup part 203 are the same as those performed by an ordinary video camera and, therefore, the details of these processes are omitted from description. The left-image luminance component signal Y-L is not only outputted from the output terminal 214 but also is supplied to the time-base compression circuit 205.

Meanwhile, the right image is formed by the photo-taking lens 202 for the right image on the image pickup plane of the image sensor which is disposed within the image pickup part 204. The image pickup part 204 then processes the right image in the same manner as the left image. The composite video signal VIDEO-R, the luminance component signal Y-R and the chrominance component signal C-R are formed by the image pickup part 204 and outputted respectively from the output terminals 218, 217 and 216. The right-image luminance component signal Y-R is not only outputted from the output terminal 216 but also is supplied to the time-base compression circuit 206. The right-image chrominance component signal C-R is supplied from the output terminal 217 to the recording and reproducing part 102 disposed next to the image pickup process part 101.

The time-base compression circuits 205 and 206 time-base-compress the left- and right-image luminance component signals Y-L and Y-R of the two channels and, after that, respectively supply them to the left-and-right-image combining part 207. At the left-and-right-image combining part 207, the luminance component signals Y-L and Y-R of two channels are time-divisionally multiplexed into a luminance component signal of one channel. At the synchronizing signal adding part 208, synchronizing signals are added to the luminance component signal in a manner as will be described later. The output of the synchronizing signal adding part 208 is supplied to a low-pass filter (LPF) 211 to have its frequency band limited to a frequency band recordable on the recording medium. As a result, the luminance component signal Y-R/L for a left-and-right composite image is outputted from the output terminal 215 to be supplied to the recording and reproducing part 102.

The luminance component signal Y-R/L for the left-and-right composite image outputted from the output terminal 215 and the chrominance component signal C-R for the right image outputted from the output terminal 217 are supplied to the recording and reproducing part 102 of FIG. 12 to be recorded on the recording medium which is not shown but is a magnetic tape or the like.

Figure 14:
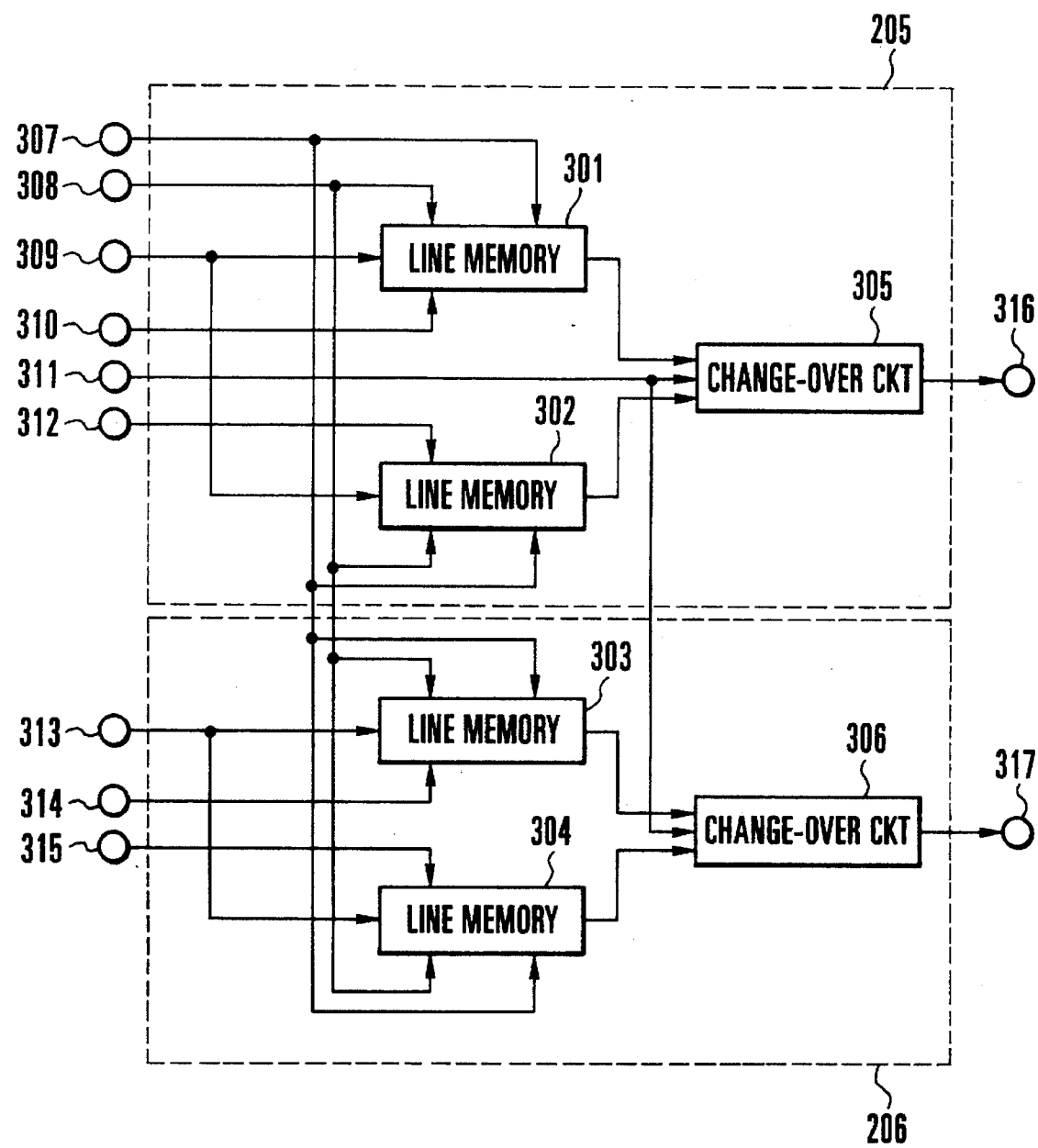
FIG. 14 is a block diagram showing in detail the arrangement of a time base compressing circuit of FIG. 13.
Figure 15A:
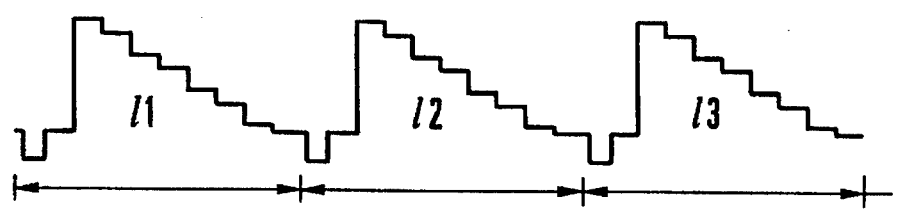
FIG. 15 is a signal waveform chart showing the states of waveforms obtained when time base compression is made and synchronizing signals are added.
Figure 15B:
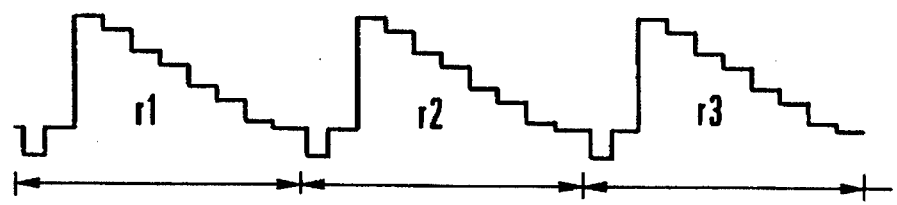
Figure 15C:
Figure 15D:
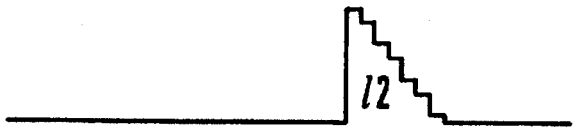
Figure 15E:
Figure 15F:
Figure 15G:
Figure 15H:
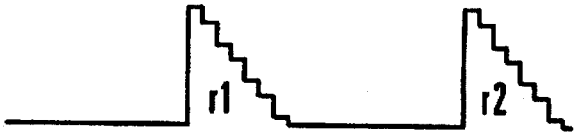
Figure 15I:
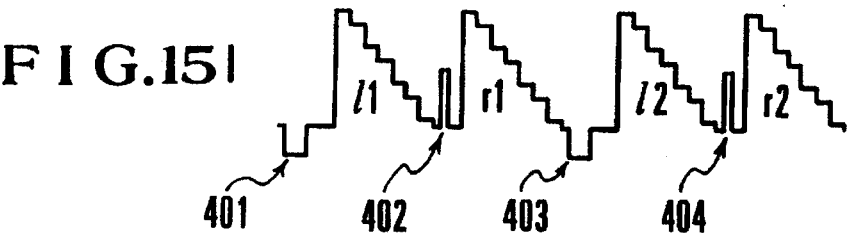

FIG. 14 shows in a block diagram the details of the time-base compression circuits 205 and 206. FIG. 15 is a signal waveform chart showing how the time-base compressing and synchronizing-signal adding actions are performed. The details of a signal forming operation for forming the luminance component signal of the left-and-right composite image are as follows:

Referring to FIG. 14, an input terminal 309 is arranged to receive the left-image luminance component signal. An input terminal 313 is arranged to receive the right-image luminance component signal. Line memories 301 and 302 are for the left-image luminance component signal. Line memories 303 and 304 are for the right-image luminance component signal. These line memories 301, 302, 303 and 304 are respectively provided with a writing clock signal input terminal 308, a reading clock signal input terminal 307, and control signal input terminals 310, 312, 314 and 315 which are arranged to receive control signals for switching between a signal writing action and a signal reading action. An input terminal 311 is arranged to input control signals to change-over circuits 305 and 306.

To the writing clock signal input terminal 308 and the reading clock signal input terminal 307 are supplied a writing clock signal and a reading clock signal from the synchronizing signal generating part 209. To the control signal input terminals 310, 312, 314 and 315 are supplied control signals from the control part 210. The left-image luminance component signal inputted from the input terminal 309 is supplied concurrently to the line memories 301 and 302. However, the signal writing action and the signal reading action on the line memories 301 and 302 are arranged to be alternately performed for every horizontal scanning period. For example, the signal writing and reading actions are controlled such that, while a signal is written into one of the line memories, a signal is read out from the other line memory. The reading clock signal supplied to the line memories 301 and 302 is arranged to have a frequency which is at least twice as high as that of the writing clock signal.

The right-image luminance component signal which is inputted from the input terminal 313 is also arranged to be written and read out alternately into and from the line memories 303 and 304 for every horizontal scanning period in the same manner as the left-image luminance component signal. However, in this case, the signal reading timing differs from the reading timing for the left-image luminance component signal.

In FIG. 15, a part A shows the left-image luminance component signal inputted to the time-base compression circuit 205. In other words, the part A shows the waveform of the signal from the input terminal 309 of FIG. 14. A part B of FIG. 15 shows the waveform of the right-image luminance component signal inputted to the time-base compression circuit 206, i.e., the waveform of the signal inputted from the input terminal 313 of FIG. 14. In FIG. 15, each of periods indicated by arrow marks represents one horizontal scanning period.

The waveform of a signal outputted from the line memory 301 of FIG. 14 is obtained by time-base-compressing the signal waveform 11 shown at the part A of FIG. 15. The signal reading timing is controlled in such a way that the signal is read out within the first half part of one horizontal scanning period as shown at a part C in FIG. 15. The waveform of a signal outputted from the line memory 302 is obtained by time-base-compressing the signal waveform 12 of the part A of FIG. 15 as shown at a part D in FIG. 15 and the reading timing is also controlled in such a way as to have it outputted in the first half part of one horizontal scanning period.

Signals outputted from the line memories 301 and 302 as shown at the parts C and D of FIG. 15 are supplied to a change-over circuit 305. The change-over circuit 305 selectively outputs these signals for every horizontal scanning period. As a result, the signals are outputted as a left-image luminance component signal from an output terminal 316 in a time-base-compressed waveform as shown at a part E of FIG. 15.

The waveform of a signal outputted from the line memory 303 of FIG. 14 is obtained by time-base-compressing the signal waveform r1 of the part B of FIG. 15 and is as shown at a part F of FIG. 15. The reading timing for this signal is controlled to have the signal read out in the latter half part of one horizontal scanning period. The waveform of a signal outputted from the line memory 304 is obtained by time-base-compressing the signal waveform r2 of the part B of FIG. 15 and is as shown at a part G in FIG. 15. The reading timing for that signal is controlled to have the signal read out in the latter half part of one horizontal scanning period.

The signals outputted from the line memories 303 and 304 in the waveforms as shown at the parts F and G of FIG. 15 are supplied to the change-over circuit 306 to be selectively outputted for every horizontal scanning period. As a result, a right-image luminance component signal is outputted from the output terminal 317 in a time-base-compressed waveform as shown at a part H of FIG. 15.

The left-and-right-image combining part 207 of FIG. 13 receives the signals of the waveforms formed in the above-stated manner as shown at the parts E and H in FIG. 15. The left-and-right-image combining part 207 combines the left-image luminance component signal and the right-image luminance component signal by selectively outputting the portions of these input signals of periods during which there exists images. A composite luminance component signal thus obtained is supplied from the part 207 to the synchronizing signal adding part 208.

At the synchronizing signal adding part 208, synchronizing signals are added, as shown at a part I in FIG. 15, in the following manner: Negative horizontal synchronizing signals 401 and 403 are added to the composite luminance component signal in positions where an ordinary video signal should have horizontal synchronizing signals. In addition to that, positive synchronizing signals 402 and 404 which serve as phase reference information at the time of reproduction are added between the luminance component signals 11 and r1 and between the luminance component signals 12 and r2 of the left-and-right composite image. As for vertical blanking periods which are not shown, a vertical synchronizing signal is also added in the same manner as an ordinary video signal. As a result, a luminance component signal of one channel is obtained and supplied to the low-pass filter 211 to have frequency band of the signal limited to a frequency band recordable on the recording medium before the signal is outputted from the output terminal 215.

In the case of this embodiment, as mentioned above, the frequency of the reading clock signal inputted to the reading clock signal input terminal 307 of FIG. 14 is arranged to be higher by more than two times than that of the writing clock signal inputted to the writing clock signal input terminal 308. The reason for this is as follows: In setting periods for adding the positive horizontal synchronizing signals 402 and 404 at the synchronizing signal adding part 208, a horizontal synchronizing signal adding period of about 5 to 10 μsec is required in a case where the video signal conforms with, for example, the NTSC TV system. Therefore, as mentioned above, the frequency of the reading clock signal is set at a value which is 2.2 to 2.5 times as high as that of the writing clock signal.

Figure 18:
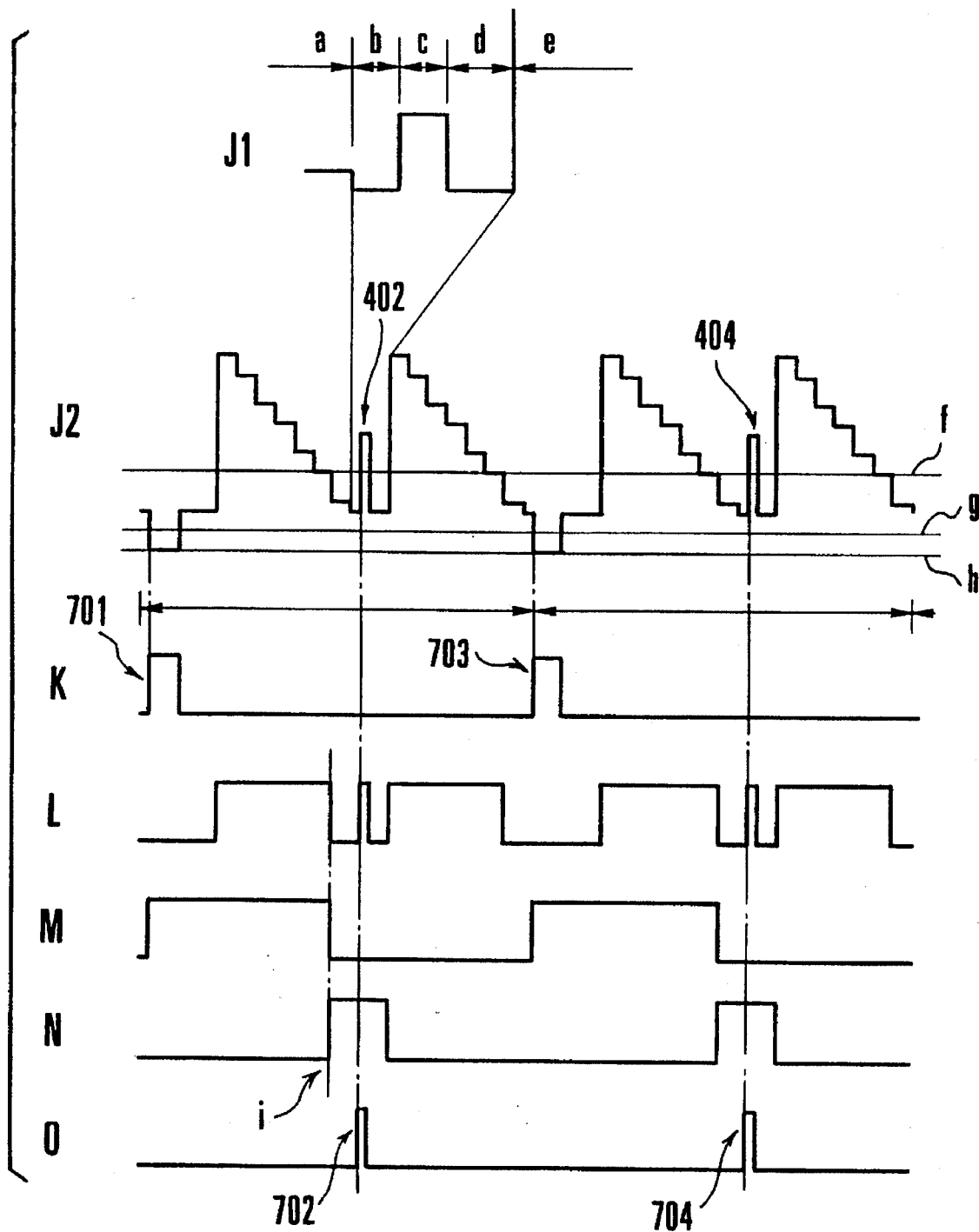
FIG. 18 shows, through waveforms of the outputs of various parts, the synchronizing signal separating action of the synchronizing signal separation circuit of FIG. 17.
Figure 19A:
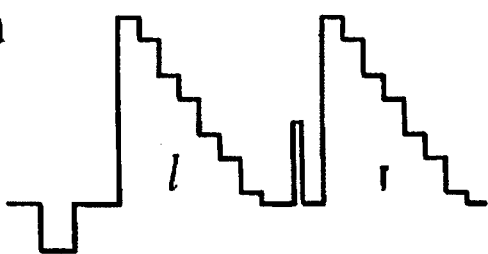
FIG. 19 shows the states of signals obtained at various part of a second embodiment of this invention.
Figure 19B:
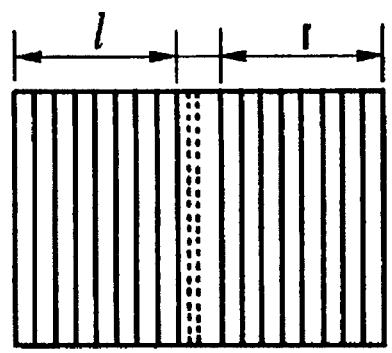
Figure 19C:
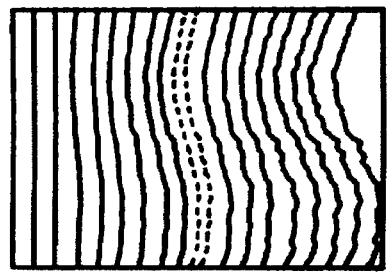
Figure 19D:
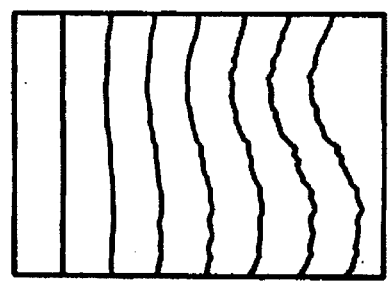
Figure 19E:
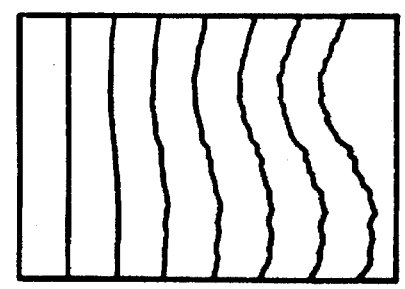

The positive horizontal synchronizing signal is shown in an enlarged state at a part J1 in FIG. 18. In the part J1 of FIG. 18, a reference symbol "a" denotes a part of the left-image luminance component signal. A symbol "e" denotes a part of the right-image luminance component signal. A symbol "c" denotes the positive synchronizing signal. Symbols "b" and "d" respectively denote blanking periods separating the positive synchronizing signal from the luminance component signals of the left and right images.

Further, in the case of the video signal which conforms to the NTSC TV system, each of the above-stated periods "b", "c" and "d" is preferably set at least at 1.0 μsec, considering the transmission characteristic of the recording and reproducing system. Further, in order to prevent as much as possible the parts of the luminance component signals from being impaired, the upper limits of these periods "b", "c" and "d" are preferably set at about 4.0 μsec, respectively.

In the case of this embodiment, among signals outputted from the output terminals 212 to 218 of FIG. 13, the luminance component signal of the left-and-right composite image outputted from the output terminal 215 and the chrominance component signal of the right image outputted from the output terminal 217 are supplied to the recording and reproducing part 102 of FIG. 12 to be recorded on the recording medium. This arrangement may be changed to use the chrominance component of the left image outputted from the output terminal 213 instead of using the chrominance component signal of the right image outputted from the output terminal 217.

Further, among the signals outputted from the output terminals 212 to 218, the signals other than the signals supplied to the recording and reproducing part 102 of FIG. 12 may be used for a stereoscopic image display during recording by supplying them, for example, to the display parts 104 and 105 of FIG. 12 without recording them on the recording medium. These signals also may be supplied to some apparatus other than the recording and reproducing part 102 of FIG. 12 to be used for recording on a different recording medium or to be transferred to some other apparatus.

Next, the processes to be performed by the reproduction process part 103 of FIG. 12 are described with reference to FIGS. 16, 17, 18 and 19 as follows:

FIG. 16 is a block diagram showing in detail the arrangement of the reproduction process part 103 of FIG. 12. Referring to FIG. 16, the luminance component signal. Y-R/L reproduced by the recording and reproducing part 102 of FIG. 12 from a recording medium which is not shown is supplied to an input terminal 506 of FIG. 16. The chrominance component signal C-R reproduced also from the recording medium is supplied to an input terminal 505. The reproduced chrominance component signal C-R supplied to the input terminal 505 is supplied from output terminals 507 and 510 to the display parts 104 and 105. The reproduced luminance component signal Y-R/L supplied to the input terminal 506 is supplied to a sychronizing signal separation circuit 501 and also to time-base expansion circuits 502 and 503. The time-base expansion circuit 502 and 503 expand the time base of these inputs. Of the time-base expanded signals, the left-image luminance component signal Y-L is outputted from an output terminal 508. The right-image luminance component signal Y-R is outputted from an output terminal 509. A control part 504 is arranged to control various parts within the reproduction process part 102, though its connection with other parts of FIG. 16 is omitted from the illustration.

Figure 17:
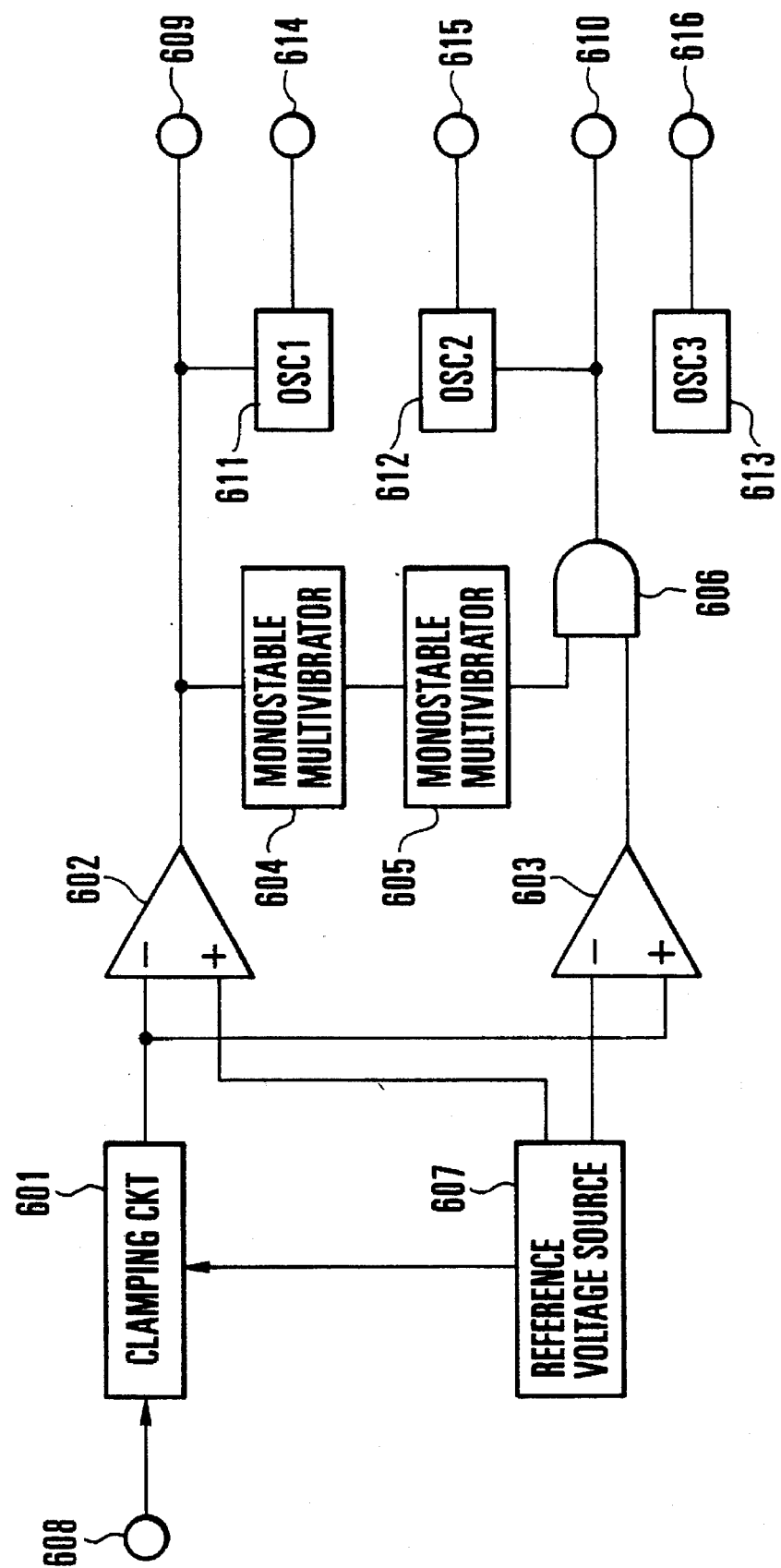
FIG. 17 is a block diagram showing in detail a synchronizing signal separation circuit of FIG. 16.

Further, the details of the arrangement of the synchronizing signal separation circuit 501 of FIG. 16 are as shown in FIG. 17. Further, FIG. 18 is a waveform chart showing the synchronizing signal separating action of the synchronizing signal separation circuit 501 through the signal waveforms of various parts. In FIG. 18, a part J2 shows the reproduced luminance component signal Y-R/L supplied to the input terminal 506 of FIG. 16.

Referring to FIG. 17, the reproduced luminance component signal supplied to the input terminal 608 is clamped by a clamping circuit 601. The clamped signal is supplied to a comparator 602 for separating the negative horizontal synchronizing signal from the reproduced luminance component signal and to a comparator 603 for separating the positive synchronizing signal which is to be used as phase reference information.

As shown at the part J2 in FIG. 18, a reference voltage which is at a level "h" is supplied from a reference voltage source 607 to the clamping circuit 601. The reference voltage source 607 also supplies a reference voltage of a level "g" to the comparator 602 and a reference voltage of a level "f" to the comparator 603. Predetermined reference voltages are thus supplied to the applicable parts. As a result, the comparator 602 outputs a signal of a waveform corresponding to the horizontal synchronizing signal as shown at a part K in FIG. 18. This signal is outputted from an output terminal 609 to be used as phase reference information for the time-base expanding actions of the time-base expansion circuits 502 and 503. The output of the comparator 602 is supplied also to a monostable multivibrator 604 and a writing clock pulse oscillator 611. The other comparator 603 outputs a signal of a waveform which shows a high level for a period during which there exists the positive synchronizing signal and also for some other period during which an image signal exists in the reproduced luminance component signal, as shown at a part L in FIG. 18. This signal is supplied to an AND circuit 606.

The monostable multivibrator 604, on the other hand, generates a pulse signal which is of a waveform showing a timing point "i", a little before the rise of the above-stated positive synchronizing signal, as shown at a part M in FIG. 18. The pulse signal M generated by the monostable multivibrator 604 is supplied to another monostable multivibrator 605 to generate a window pulse signal showing a high level for a period during which the above-stated positive synchronizing signal should exist, as shown at a part N in FIG. 18. The window pulse signal N is supplied to the AND circuit 606.

The AND circuit 606 performs an AND operation on the signal L supplied from the comparator 603 and the window pulse signal N supplied from the monostable multivibrator 605. As a result, only a positive synchronizing signal which is as shown at a part O in FIG. 18 is extracted and outputted from an output terminal 610. The positive synchronizing signal O is also supplied to a writing clock pulse oscillator 612.

Each of the time-base expansion circuits 502 and 503 has two line memories in the same manner as the time-base compression circuits 205 and 206 of FIG. 13. In writing and reading an input signal into and from these line memories, the time base of the input signal can be expanded by reading out the signal at a speed which is slower than a signal writing speed. The frequency of writing clock pulses which corresponds to the speed of writing input signal into the line memories of the time-base expansion circuits 502 and 503 is arranged to be equal to that of the reading clock pulses used for signal reading from the line memories of the time-base compression circuits 205 and 206 of FIG. 13. The frequency of reading clock pulses which corresponds to the speed of reading the input signal from the line memories of the time-base expansion circuits 502 and 503 is also arranged to be equal to that of the writing clock pulses used in writing signals into the line memories of the time-base compression circuits 205 and 206 of FIG. 13.

The signal shown at the part K in FIG. 18 is supplied from an output terminal 609 of the synchronizing signal separation circuit 501 to the time-base expansion circuit 502. The signal shown at the part O in FIG. 18 is supplied from an output terminal 610 of the synchronizing signal separation circuit 501 to the time-base expansion circuit 503. The timing of commencement of writing signals into the line memories of the time-base expansion circuits 502 and 503 is controlled by signals outputted from the synchrozinging signal separation circuit 501 in the forms as shown at the parts K and O in FIG. 18. The input signal writing action on the line memory of the time-base expansion circuit 502 begins according to the signal shown at the part K of FIG. 18. The input signal writing action on the line memory of the time-base expansion circuit 503 begins according to the signal shown at the part O of FIG. 18.

Referring further to FIG. 17, the writing clock pulse oscillator 611 is arranged to generate the writing clock pulses for writing into the line memory of the time-base expansion circuit 502 of FIG. 16. A writing clock pulse oscillator 612 is arranged to generate the writing clock pulses for writing into the line memory of the time-base expansion circuit 503. A reading clock pulse oscillator 613 is arranged to generate reading clock pulses for reading signals from the line memories of both the time-base expansion circuits 502 and 503.

The writing clock pulse oscillators 611 and 612 are so-called gated oscillators. They are arranged to have the initial phases of their writing clock pulses controlled by the signals shown at the parts K and O of FIG. 18. In accordance with the writing clock pulses coming from the writing clock pulse oscillators 611 and 612, the time-base expansion circuits 502 and 503 write the input signal into their line memories. As a result, a portion of the input signal obtained for the first half part of one horizontal scanning period is written into the line memory in a state of having its phase coinciding with the negative horizontal synchronizing signal. Another input signal portion obtained for the latter half part of one horizontal scanning period is written into the line memory in a state of having its phase coinciding with the positive horizontal synchronizing signal.

After completion of the signal writing actions on the line memories, the signals written are read out according to the reading clock pulse signals of frequencies which are the same as those of the writing clock pulses used for the line memories of the time-base compression circuits 205 and 206 of FIG. 13. As a result, the left-image luminance component signal which is time-base-expanded is outputted from the output terminal 508 and the right-image luminance component signal which is also time-base-expanded is outputted from the output terminal 509.

The luminance and chrominance component signals of the left and right images thus outputted from the output terminals 507 to 510 are supplied respectively to the display parts 104 and 105 of FIG. 12. These signals are then displayed by display devices of any kinds such as CRT or LCD devices at the display parts 104 and 105.

FIG. 19 shows the states of the signals obtained by the above-stated processes. In FIG. 19, a part (a) shows the waveform of the signal inputted to the reproduction process part 103. A part (b) shows a display image plane obtained when the signal is displayed in the form of an image before recording on the recording medium by the recording and reproducing part 102. A part (c) shows a display image plane obtained when the signal reproduced from the recording medium by the recording and reproducing part 102 is displayed in the form of an image before a time-base variation component is removed from the reproduced signal. A part (d) shows a display image plane obtained when a signal portion corresponding to the left image is displayed in the form of an image after the signal reproduced from the recording medium by the recording and reproducing part 102 is subjected to the process of removing a time-base variation component. A part (e) shows a display image plane obtained when a signal portion corresponding to the right image is displayed in the form of an image after the signal reproduced from the recording medium by the recording and reproducing part 102 is subjected to the time-base variation component removing process.

Figure 1:
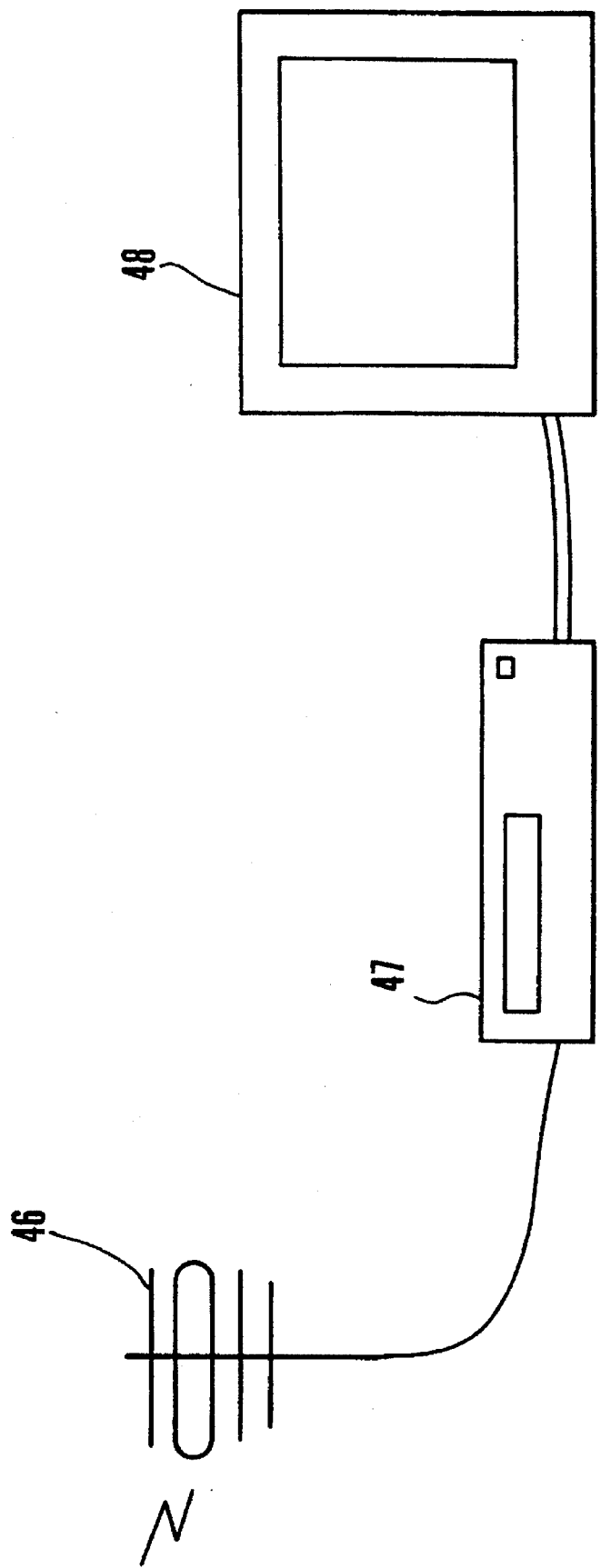
FIG. 1 roughly shows the arrangement of essential parts of the conventional television system.
Figure 2:
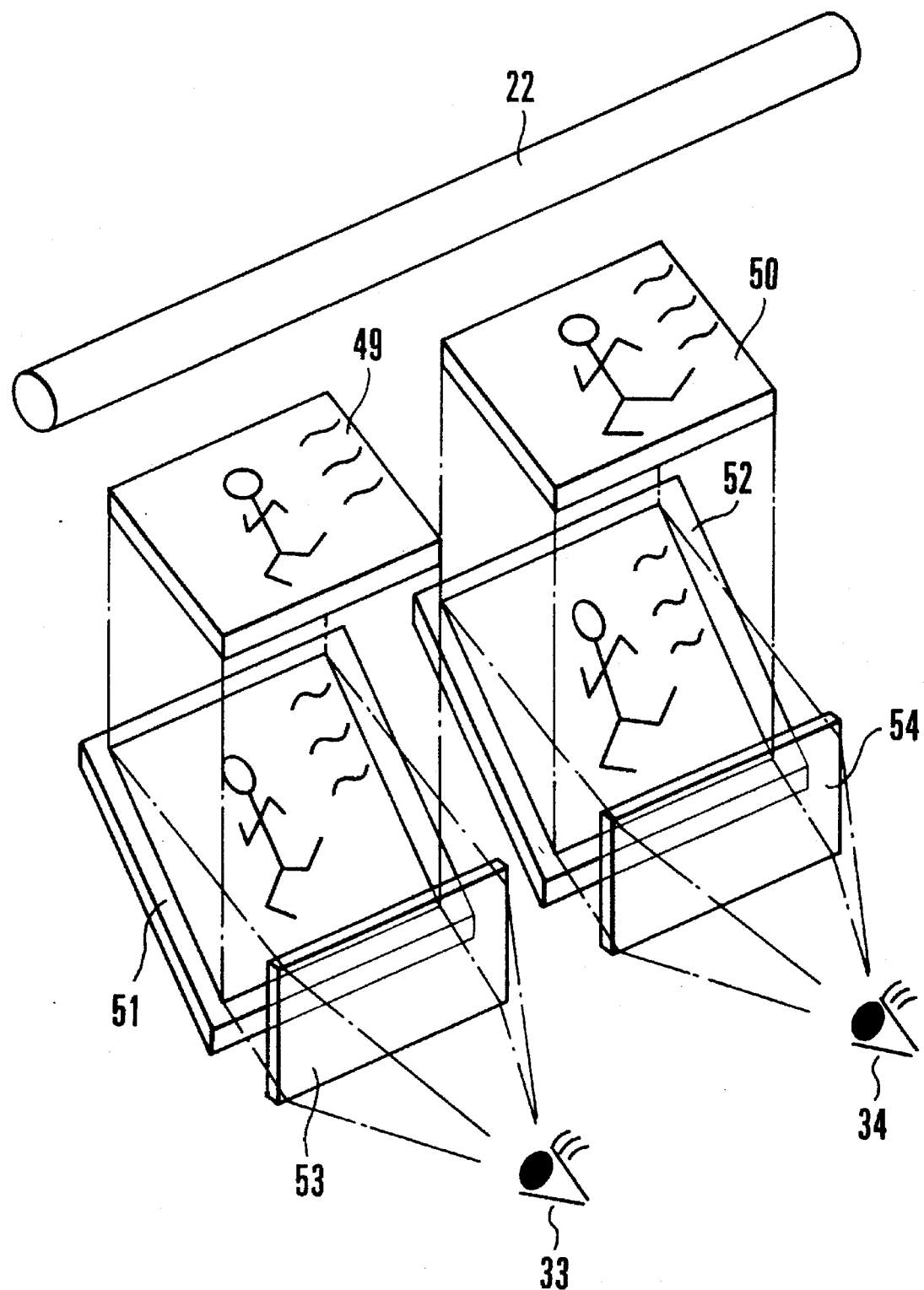
FIG. 2 schematically shows the arrangement of essential parts of the conventional stereoscopic image display apparatus.
Figure 3:
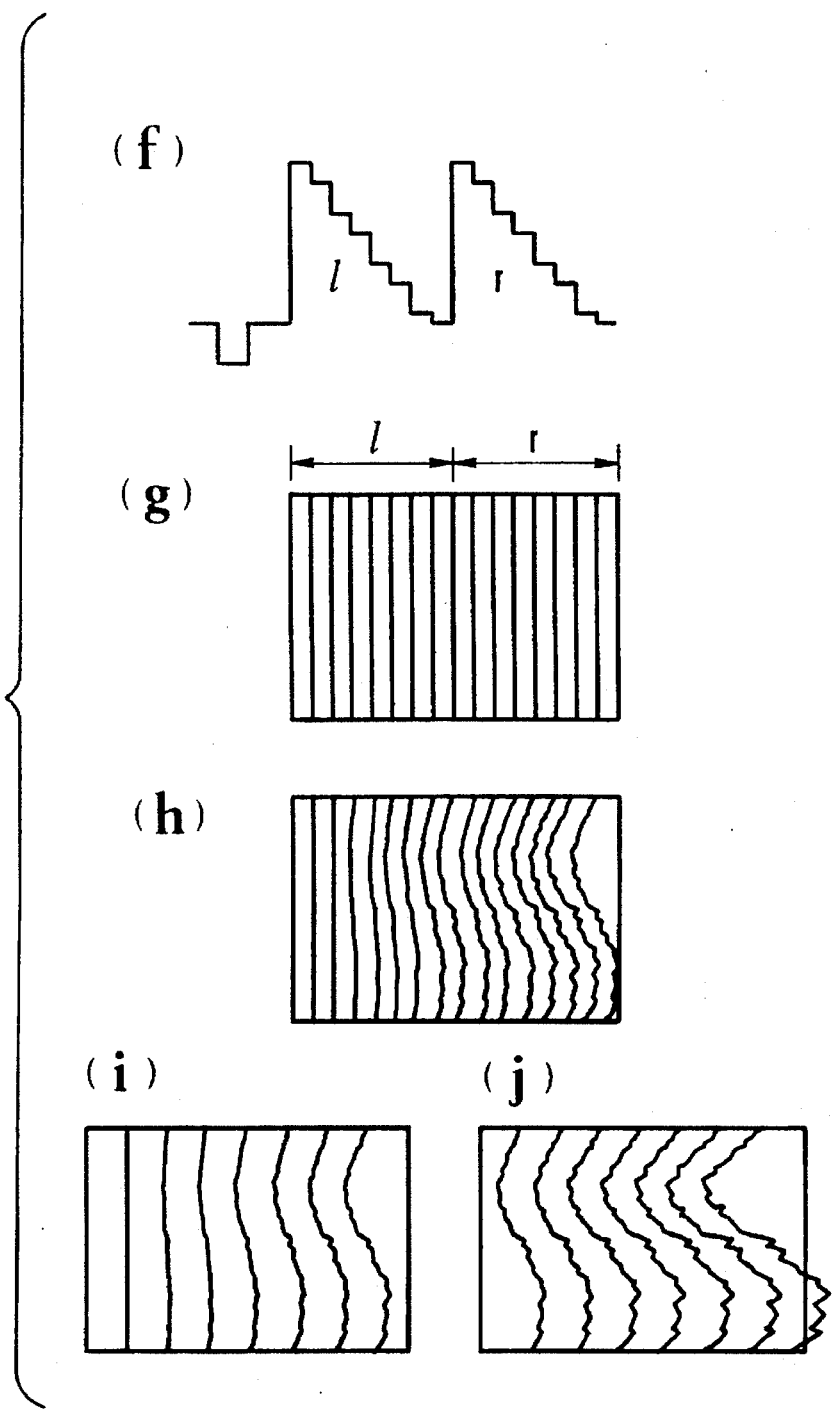
FIG. 3 shows the displays of a stereoscopic image recorded and reproduced by the conventional stereoscopic image recording and reproducing apparatus.

As shown at the parts (d) and (e) in FIG. 19, unlike in the case of the parts (i) and (j) of FIG. 3, the time base variations generated at the recording and reproducing systems are not enlarged by the image compressing and expanding processes in the luminance component signal of the right image, and the left and right images are processed and displayed in a state of having about the same amount of time base variations.

In displaying the left and right images, in the case of the second embodiment, the chrominance component is arranged such that the chrominance component signal of only one of the right and left images is recorded on the recording medium and, at the time of reproduction, the same chrominance component is supplied to the left and right image displaying display parts. This arrangement, however, may be changed to supply the chrominance component signal reproduced from the recording medium only to one of the display parts (for example, only to the right image displaying display part, as shown in FIG. 16), while only the luminance component signal is supplied to the other display part without supplying the chrominance component signal, in such a way as to give a display of a black and white image.

A third embodiment of this invention is next described with reference to FIGS. 20 to 24 as follows:

FIG. 20 shows in a block diagram the details of the arrangement of an image pickup process part of a stereoscopic image recording and reproducing apparatus arranged as the third embodiment of this invention. A control part 918 is arranged to control the various parts of the image pickup process part, though its connection with other parts is omitted from the illustration.

Figure 21:
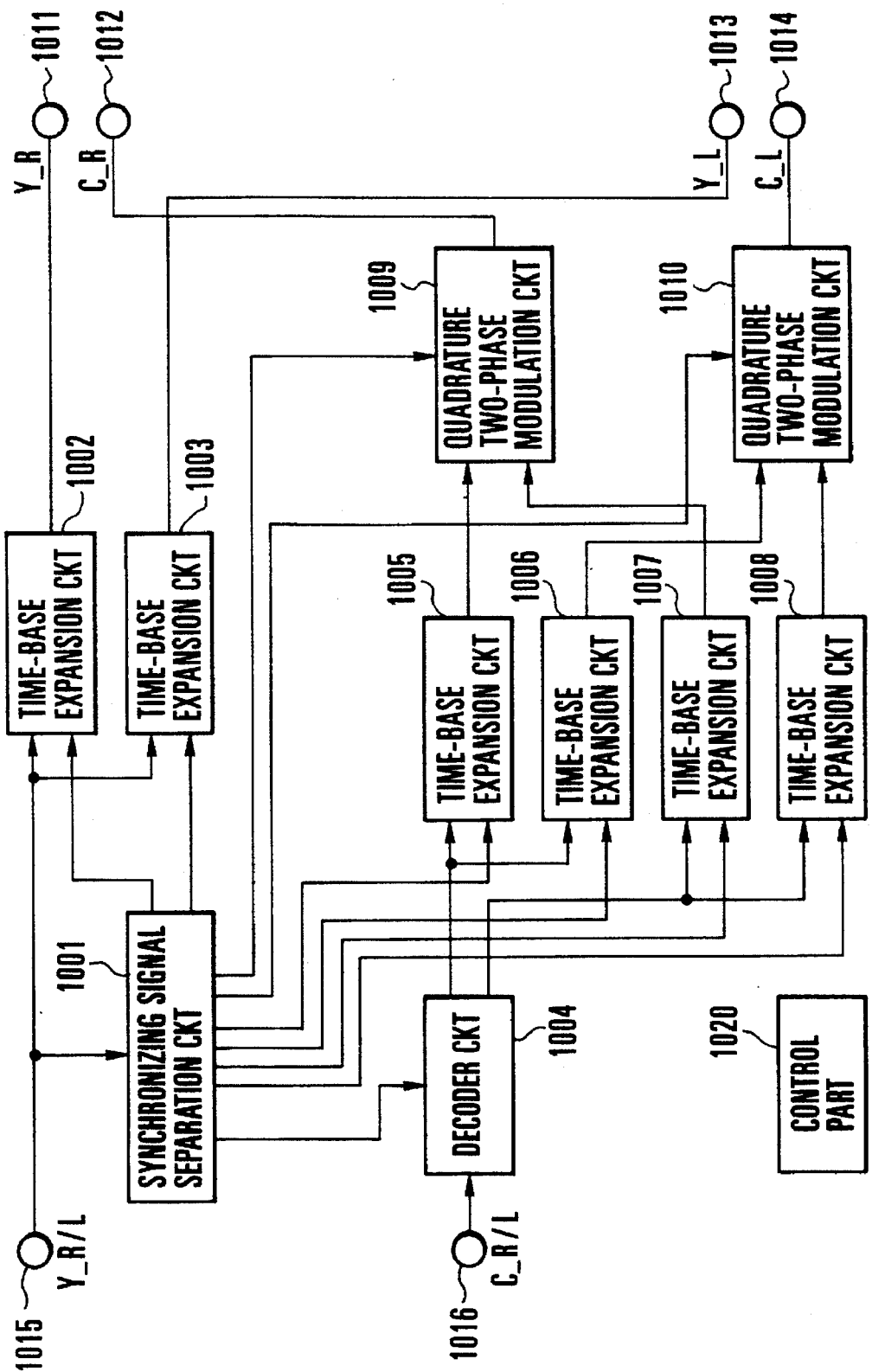
FIG. 21 is a block diagram showing in detail the arrangement of a reproduction process part of the third embodiment of this invention.
Figure 23:
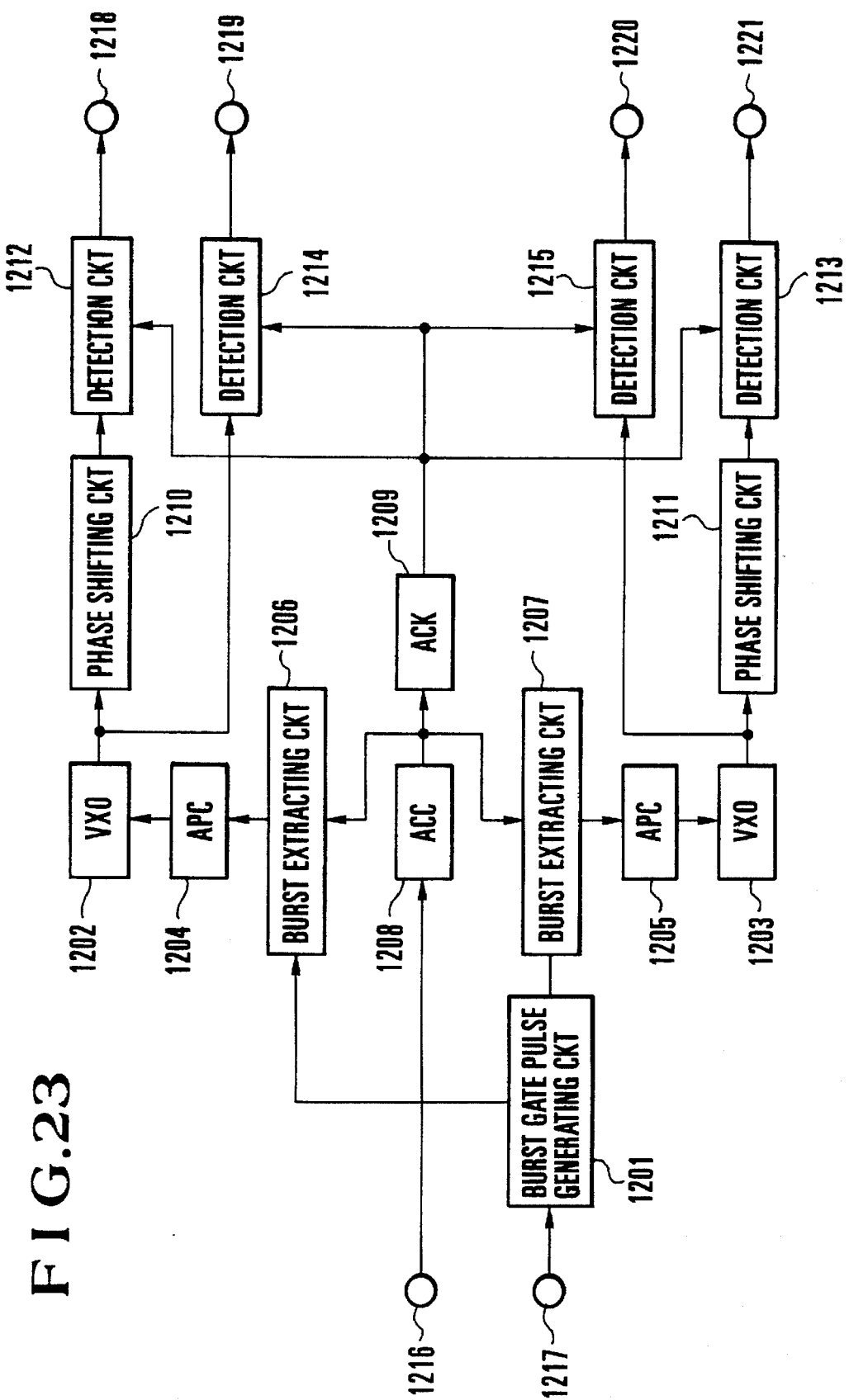
FIG. 23 is a block diagram showing in detail the arrangement of a decoder circuit shown in FIG. 21.

FIGS. 21 and 23 show in block diagrams the details of arrangement of a reproduction process part of the stereoscopic image recording and reproducing apparatus which is the third embodiment. Although its connection to other parts is omitted from the illustration, a control part 1020 shown in FIG. 21 is arranged to control various parts of the reproduction process part.

Figure 22:
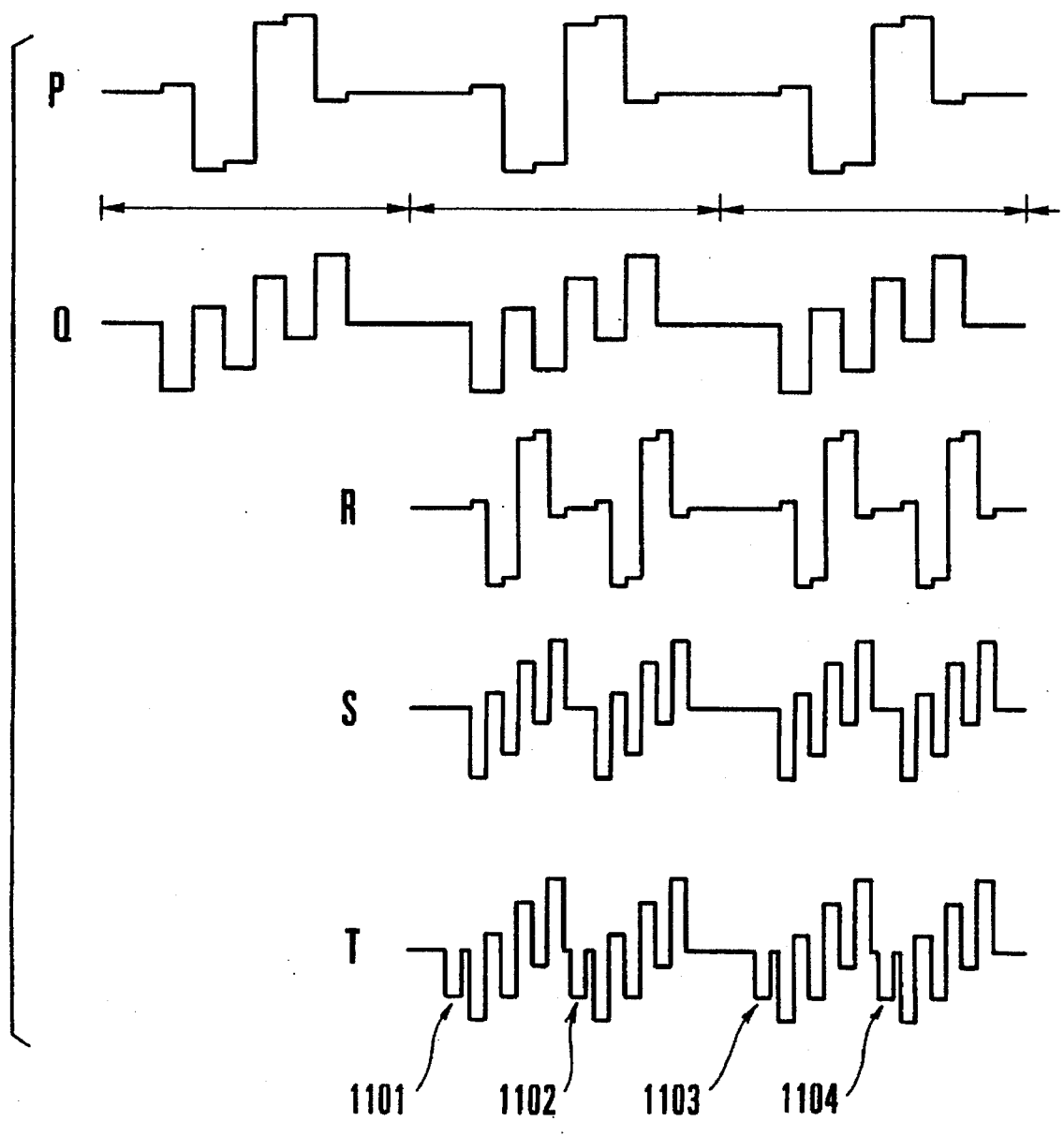
FIG. 22 is a waveform chart showing the signal waveforms of the outputs of various parts of the image pickup and processing parts shown in FIG. 20.
Figure 24:
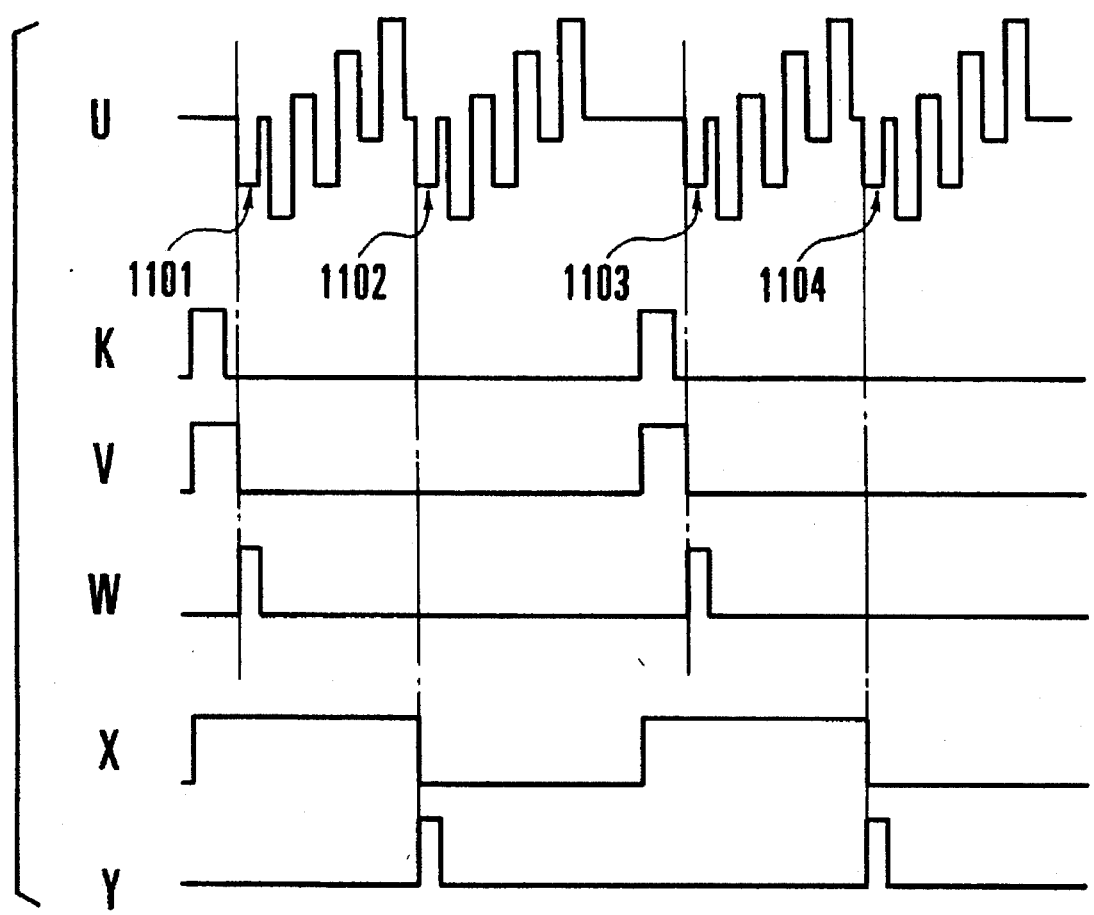
FIG. 24 is a timing chart showing the waveforms of outputs of various parts of the decoder circuit.

FIG. 22 shows signal waveforms obtained at the various parts of the image pickup process part shown in FIG. 20. FIG. 24 shows signal waveforms obtained at the various parts of the reproduction process part shown in FIGS. 21 and 23. The arrangement of the third embodiment as the whole apparatus is identical with the arrangement shown in FIG. 12. Further, the third embodiment processes the luminance component signals in the same manner as the second embodiment which has been described above. The description of the luminance component signal processing operation of the second embodiment given in the foregoing, therefore, applies also to the third embodiment.

The processes to be performed by the image pickup process part of the third embodiment is described first with reference to FIGS. 20 and 22 as follows:

Referring to FIG. 20, a luminance component signal Y-L and color-difference signals B-Y-L and R-Y-L for the left image are outputted from an image pickup part 903. The color-difference signals B-Y-L and R-Y-L are time-base-compressed respectively by time-base compression circuits 907 and 908. The time-base-compressed color-difference signal B-Y-L is supplied to a left-and-right-image combining part 913 which is provided for a color difference B-Y. The time-base-compressed color-difference signal R-Y-L is supplied to a left-and-right-image combining part 914 for a color difference R-Y. Another image pickup part 904 outputs a luminance component signal Y-R and color-difference signals B-Y-R and R-Y-R for the right image. These signals are likewise time-base-compressed by time-base compression circuits 910 and 911. The time-base-compressed color-difference signal B-Y-R is supplied to a left-and-right-image combining part 913 which is provided for the color difference B-Y. The time-base-compressed color-difference signal R-Y-R is supplied to a left-and-right-image combining part 914 which is for the color difference R-Y. Time-base compression circuits 906 to 911 are arranged and operate in the same manner as those of the second embodiment described in the foregoing. Therefore, they require no further detailed description.

As mentioned above, to the time-base compression circuits 907 and 910 are inputted the color-difference signals B-Y-L and B-Y-R, which are of a waveform as shown at a part Q in FIG. 22. After these signals are time-base-compressed by the time-base compression circuits 907 and 910, they are time-divisionally multiplexed by the left-and-right-image combining part 913 to be made into a color-difference signal B-Y-R/L of a left-and-right composite image, which is of a waveform as shown at a part S in FIG. 22. The left-and-right composite image color-difference signal B-Y-R/L is supplied to a burst flag adding circuit 916. At the burst flag adding circuit 916, burst flags 1101 and 1103 which are of waveforms as shown at a part T in FIG.

22 are added to the color-difference signal B-Y-R/L of the left-and-right composite image. The burst flags 1101 and 1103 are added during horizontal blanking periods. However, in addition to these flags, other burst flags 1102 and 1104 are also added during blanking periods provided between the time-base-compressed left color-difference signal B-Y-L and the right color difference signal B-Y-R, as shown at the part T of FIG. 22. The output of the burst flag adding circuit 916 is supplied to a quadrature two-phase modulation circuit 917.

To the time-base compression circuits 908 and 911 are inputted the color-difference signals R-Y-L and R-Y-R which are of a waveform as shown at a part P in FIG. 22. They are time-base-compressed respectively by the time-base compression circuits 908 and 911. After that, they are time-divisionally multiplexed by a left-and-right-image combining part 914 for the color difference R-Y and are thus made into a color-difference signal R-Y-R/L of a left-and-right composite image to have a waveform as shown at a part R in FIG. 22. The left-and-right composite image color-difference signal R-Y-R/L is supplied to the quadrature two-phase modulation circuit 917 with no burst flag added.

The left-and-right composite image color-difference signal R-Y-R/L supplied from the burst flag adding circuit 916 and the left-and-right composite image color-difference signal R-Y-R/L supplied from the left-and-right-image combining part 914 for the color difference R-Y are quadrature two-phase modulated by the quadrature two-phase modulation circuit 917. By this process, a carrier chrominance signal C-R/L for the left-and-right composite image is formed and outputted from an output terminal 920.

As for the luminance component signal, the same processes as those of the second embodiment are carried out to obtain a luminance component signal Y-R/L for the left-and-right composite image. The luminance component signal Y-R/L is outputted from an output terminal 919. The luminance component signal Y-R/L for the left-and-right composite image from the output terminal 919 and the carrier chrominance component signal C-R/L from the output terminal 920 are supplied to the recording and reproducing part 102 to be recorded on the recording medium.

The operation of the reproduction process part of the third embodiment is next described with reference to FIGS. 21, 23 and 24 as follows:

Like in the case of the second embodiment, a reproduced luminance component signal and a reproduced chrominance component signal obtained by the recording and reproducing part 102 from the recording medium which is not shown is inputted to the reproduction process part which is arranged as shown in FIG. 21.

Referring to FIG. 21, the reproduced luminance component signal Y-R/L inputted from an input terminal 1015 is processed in the same manner as in the case of the second embodiment. As a result, a luminance component signal Y-R for the right image is outputted from an output terminal 1011. A luminance component signal Y-L for the left image is outputted from an output terminal 1013. As for the reproduced chrominance component signal C-R/L, the signal is inputted from an input terminal 1016 and is then supplied to a decoder circuit 1004.

The details of the arrangement of the decoder circuit 1004 of FIG. 21 are as shown in FIG. 23 which is a block diagram. Referring to FIG. 23, the decoder circuit 1004 includes an input terminal 1216, an input terminal 1217, which is arranged to receive a synchronizing signal separated from the reproduced luminance component signal by a synchronizing signal separation circuit 1001 of FIG. 21, and a burst gate pulse generating circuit 1201 which is arranged to generate pulses of various kinds to be used for a burst extracting process as will be described later.

FIG. 24 is a timing chart showing the signal waveforms of various parts of the decoder circuit 1004 which is arranged as shown in FIG. 23. In FIG. 24, a part K shows a synchronizing signal inputted from the input terminal 1217 of FIG. 23. A part W shows burst gate pulses formed in synchronism with first burst flags 1101 and 1103. A part Y shows burst gate pulses formed in synchronism with second burst flags 1102 and 1104. The burst gate pulses W and Y are formed by monostable multivibrators, etc., which are not shown but are disposed within the burst gate pulse generating circuit 1201.

The burst gate pulses W and Y formed by the burst gate pulse generating circuit 1201 are supplied respectively to burst extracting circuits 1206 and 1207.

Referring to FIG. 23, the reproduced chrominance component signal inputted from the input terminal 1216 is supplied to a color adjustment circuit (ACC) 1208 to have its gain adjusted. After gain adjustment, the reproduced chrominance component signal is supplied to the burst extracting circuits 1206 and 1207. The burst extracting circuits 1206 and 1207 extract, from the reproduced chrominance component signal, a burst signal corresponding to the first burst flag and a burst signal corresponding to the second burst flag. The extracted burst signals are supplied to phase detecting circuits (APC) 1204 and 1205.

Subcarrier signals to be used for demodulating the quadrature two-phase modulated reproduced chrominance component signal are generated by oscillation circuits (VXO) 1202 and 1203 according to the signals outputted from the phase detecting circuits 1204 and 1205. The subcarrier signals generated by the oscillation circuits 1202 and 1203 are supplied to phase shifting circuits 1210 and 1211 to have their phases shifted 90 degrees. The subcarrier signals phase-shifted 90 degrees by the phase shifting circuits 1210 and 1211 and the subcarrier signals not phase-shifted are supplied respectively to detection circuits 1212 to 1215. The detection circuits 1212 to 1215 also receive the reproduced chrominance component signal which has undergone the gain adjusting process of the color adjustment circuit 1208 and a known color killing process of a color killer circuit (ACK) 1209. The detection circuits 1212 to 1215 perform detection processes on the reproduced chrominance component signal from the color killer circuit 1209 according to the subcarrier signals received from the oscillation circuits 1202 and 1203 and the phase shifting circuits 1210 and 1211. The detection circuits 1212 to 1215 demodulate the input signals into color-difference signals of a base band by carrying out the detection processes. The demodulated signals are outputted from output terminals 1218 to 1221.

The base-band color-difference signals obtained through the detection circuits 1212 to 1215 and outputted from the output terminals 1218 to 1221 are supplied to time-base expansion circuits 1005 to 1008 of FIG. 21 to be time-base-expanded in the same manner as the luminance component signals. The color-difference signal of the right image is quadrature two-phase modulated by a quadrature two-phase modulation circuit 1009. The color-difference signal of the left image is quadrature two-phase modulated by a quadrature two-phase modulation circuit 1010. The quadrature two-phase modulated color-difference signals are outputted from output terminals 1012 and 1014.

As described above, according to the arrangement of the third embodiment, the adverse effect of the time-base variation component on the chrominance component signal can be eliminated. Not only the luminance component signal but also the chrominance component signals for the left and right images can be recorded and reproduced on and from the recording medium. Therefore, in a case where signals reproduced from the recording medium are to be supplied to and displayed on an ordinary display device, the display position on the display image plane of the luminance component and that of the chrominance component coincide with each other to give an adequate color image display without any color deviation.

A fourth embodiment of this invention is described with reference to FIG. 25 as follows:

The arrangement of the fourth embodiment is arranged in about the same manner as that of the second embodiment shown in FIGS. 12 to 19 and has been described in the foregoing. However, the fourth embodiment differs from the second embodiment in the manner in which the synchronizing signals are added. The following description, therefore, mainly covers the difference of the fourth embodiment from the second embodiment.

In the case of the second embodiment, only the image signals corresponding to effective image planes, excluding blanking periods, are time-base-compressed both for the left-image luminance component signal and the right-image luminance component signal. After that, a luminance component signal for a left-and-right composite image is formed by time-divisionally multiplexing the time-base-compressed left-image luminance component signal and the time-base-compressed right-image luminance component signal in such a way as to have them before and after each other within one and the same horizontal scanning period. A negative horizontal synchronizing signal which is separately generated is added during a blanking period which corresponds to the start point of each horizontal scanning period. A positive synchronizing signal is added during a blanking period provided between the luminance component signals of the left and right images. On the other hand, the fourth embodiment is arranged to use a horizontal synchronizing signal which is already included in the right-image luminance component signal as the synchronizing signal which is to be inserted during the blanking period between the luminance component signals of the left and right images for use as phase reference information for the image signal of the right image.

Figure 25:
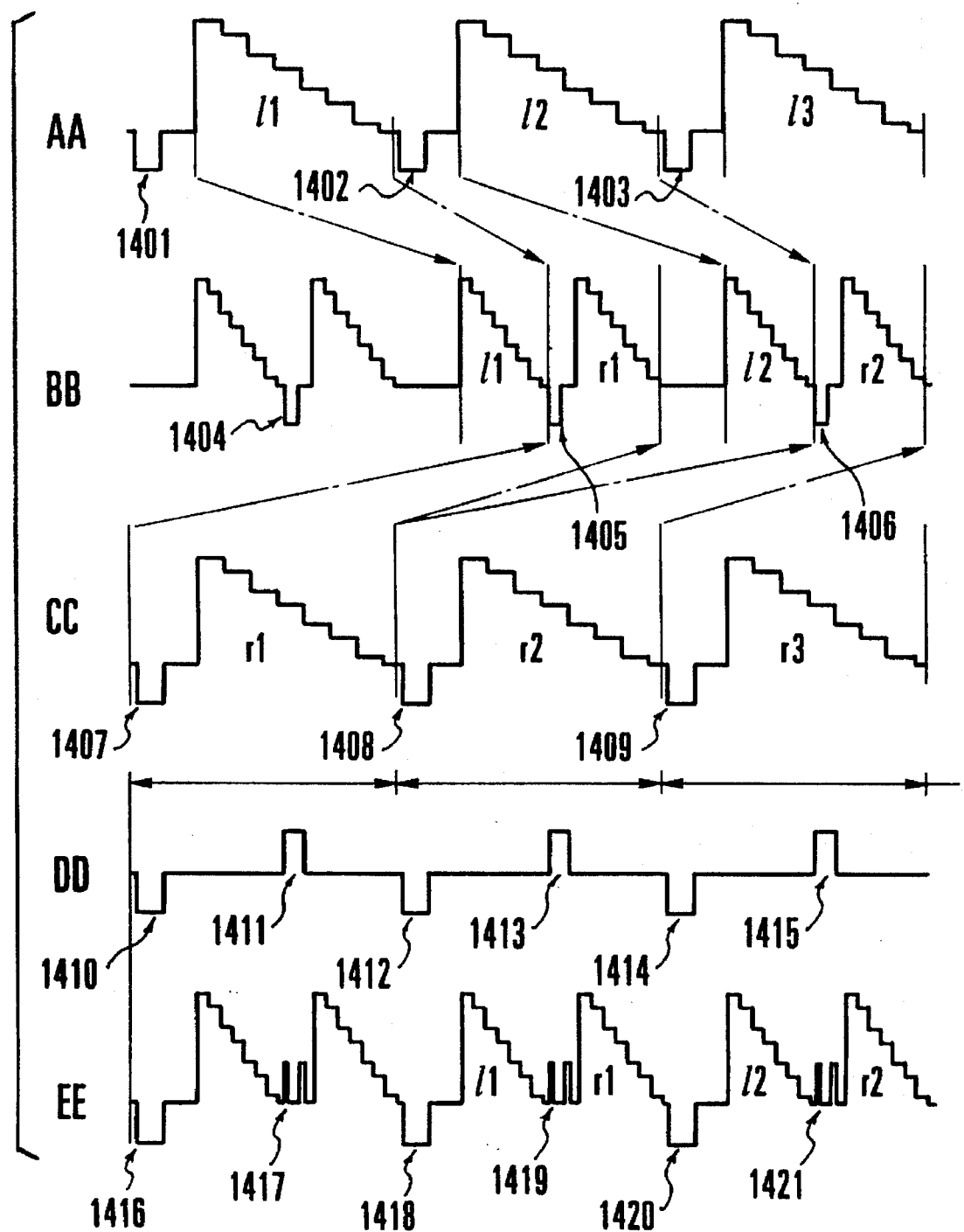
FIG. 25 is a timing chart showing the operation of a fourth embodiment of this invention.

FIG. 25 shows in a timing chart the operation of the fourth embodiment. In FIG. 25, a part AA shows the luminance component signal of the left image. A part CC shows the luminance component signal of the right image. The right-image luminance component signal CC includes horizontal synchronizing signals 1407, 1408 and 1409 which are arranged to be time-base-compressed together with the right-image luminance component signal. After the time-base compression, these signals 1407, 1408 and 1409 become horizontal synchronizing signals 1405 and 1406 as shown at a part BB in FIG. 25.

In other words, the fourth embodiment is arranged as follows: The luminance component signal for the left image is time-base-compressed only at an image signal portion corresponding to an effective image plane in the same manner as the second embodiment. As regards the luminance component signal for the right image, on the other hand, the whole image of each horizontal scanning period including the horizontal synchronizing signal is time-base-compressed. The left-image luminance component signal and the right-image luminance component signal are selectively outputted and time-divisionally multiplexed, in the same manner as the second embodiment, to form a signal as shown at the part BB in FIG. 25.

A signal of a waveform as shown at a part EE in FIG. 25 is formed by adding to the signal shown at the part BB a signal of a waveform shown at another part DD.

The signal shown at the part DD includes horizontal synchronizing signals 1410, 1412 and 1414, which become parts 1416, 1418 and 1420 of the signal shown at the part EE of FIG. 25. Further, positive pulses 1411, 1413 and 1415 included in the signal DD are provided for distinguishing the horizontal synchronizing signals 1404, 1405 and 1406 included in the time-base-compressed right-image luminance component signal shown at the part BB from the horizontal synchronizing signals included in the signal DD. With the signal of the part BB added to the signal of the part DD, the horizontal synchronizing signals 1404, 1405 and 1405 included in the time-base-compressed right-image luminance component signal of the part BB respectively become synchronizing signals 1417, 1419 and 1421 included in the signal of a waveform as shown at the part EE of FIG. 25.

The fourth embodiment is arranged to newly generate the signal as shown at the part DD for adding horizontal synchronizing signals to the luminance component signal of the left-and-right composite image. However this arrangement may be changed to use the horizontal synchronizing signals 1401, 1402 and 1403 included in the left-image luminance component signal shown at a part AA in FIG. 25 as they are without subjecting them to the time-base compressing process.

In the case of the fourth embodiment described, the horizontal synchronizing signals which are already included in the right-image luminance component signal are time-base-compressed together with the right-image luminance component signal and are used as phase reference information. The arrangement obviates the necessity of any arrangement for newly generating the synchronizing signals and for adding the newly generated synchronizing signals, so that the arrangement of the apparatus can be simplified. Besides, since no timing control that would be required in adding such newly generated synchronizing signals is necessary, the accuracy of the phase reference information can be increased.

In recording and reproducing on and from a recording medium a stereoscopic image signal for a stereoscopic image which is composed of left and right images, each of the embodiments is arranged as described above to be capable of mitigating the adverse effects of a time base variation component generated at the recording and reproducing systems on the stereoscopic image. Therefore, the stereoscopic image signal can be adequately reproduced by the stereoscopic image recording and reproducing apparatus embodying this invention.

What is claimed is:

1. A stereoscopic image processing apparatus for recording on a recording medium a stereoscopic image signal for a stereoscopic image which is composed of left and right images, comprising:
  a) time base compressing means arranged to time-base-compress and output image signals corresponding respectively to the left and right images for every horizontal scanning period;
  b) image signal combining means for combining and outputting the image signals which correspond respectively to the left and right images and are time-base-compressed by said time base compressing means by proving a predetermined blanking period within every horizontal scanning period in such a way as to have the image signals located across the blanking period in the direction of the time base;

c) signal adding means for adding to the time-base-compressed and combined image signals both a horizontal synchronizing signal during a horizontal blanking period provided at the front of a portion of the time-base-compressed and combined image signals outputted by said image signal combining means, said portion corresponding to the left image, and a phase reference signal during a blanking period provided at between portions of the time-base-compressed and combined image signals corresponding respectively to the left and right images, said phase reference signal being different from said horizontal synchronizing signal and serving as a phase reference at the time of reproduction and thereby outputting a signal obtained by the above addition; and d) recording means for recording on the recording medium the signal outputted from said signal adding means.

2. An apparatus according to claim 1, wherein said time base compressing means is arranged to time-base-compress and output an amount for one horizontal scanning period of the image signals for the right and left images during a period which is approximately one half of a period obtained by removing a period of adding the signal to be used as phase reference for reproduction from an image signal portion corresponding to an effective image plane which excludes the horizontal blanking period.

3. An apparatus according to claim 1, wherein said stereoscopic image signal includes a luminance component signal and a chrominance component signal, wherein said signal adding means includes phase synchronizing signal adding means for adding a phase reference signal to the time-base-compressed and combined luminance component signals, said phase reference signal being different from said horizontal synchronizing signal and serving as a phase reference at the time of reproduction, during a blanking period provided at between portions of the time-base-compressed and combined luminance component signals, outputted by said image signal combining means, corresponding respectively to the left and right images and outputting a signal obtained by the above addition and color burst signal adding means for adding a color burst signal serving as a phase reference at the time of reproduction to the time-base-compressed and combined chrominance component signals during a horizontal blanking period provided at the front of a portion of the time-base-compressed and combined chrominance component signals outputted by said image signal combining means, said portion corresponding to the left image, and during a blanking period provided at between portions of the time-base-compressed and combined chrominance component signals corresponding respectively to the left and right images and outputting a signal obtained by the above addition.

4. A stereoscopic image reproducing apparatus for reproducing a stereoscopic image signal from a recording medium on which the stereoscopic image signal for a stereoscopic image which is composed of left and fight images is recorded, comprising:

a) reproducing means for reproducing and outputting the stereoscopic image signal recorded on the recording medium;

b) time base expanding means arranged to separate from the signal outputted from said reproducing means, image signals which correspond respectively to the left and fight images and have been time-base-compressed for every horizontal scanning period, to time-base-expand the image signals corresponding respectively to the left and right images and to output the time-base-expanded images; and c) control means for extracting both a horizontal synchronizing signal which is added to time-base compressed and combined image signals outputted by said reproducing means, during a horizontal blanking period provided at the front of a portion of said time-based-compressed and combined image signals, said portion corresponding to the left image, and a phase reference signal, said signal being different from said horizontal synchronizing signal and serving as a reference at the time of reproduction, which is added to the time-base compressed and combined image signals, during a blanking period provided at between portions of the time-base-compressed and combined image signals, said portions corresponding respectively to the left and right images, and thereby controlling a time base expanding process of said time base expanding means by means of the horizontal synchronizing signal and phase reference signal thus extracted.

5. An apparatus according to claim 4, wherein said stereoscopic image signal includes a luminance component signal and a chrominance component signal, and wherein said time base expanding means includes luminance component signal time base expanding means arranged to separate, from the signal outputted from said reproducing means, luminance component signals which respectively correspond to the left and right images separated from each other and are in a state of having been time-base-compressed for every scanning period and to time-base-expand and output the luminance component signals corresponding to the left and right images, and chrominance component signal time base expanding means arranged to separate, form the signal outputted from said reproducing means, chrominance component signals which respectively correspond to the left and right images separated and are in a state of having been time-base-compressed for every scanning period and to time-base-expand and output the chrominance component signals for the left and right images.

6. An apparatus according to claim 5, wherein said stereoscopic image signal includes a luminance component signal and a chrominance component signal, wherein said control means is arranged to extract a phase reference signal, said phase reference signal being different from said horizontal synchronizing signal and serving as a phase reference at the time of reproduction, which is added to the time-base-compressed and combined luminance component signals outputted by the reproduction means during a blanking period provided at between portions of the time-base-compressed and combined luminance component signals, said portions corresponding respectively to the left and right images and control a time base expanding process of said luminance component signal time base expanding means by means said phase reference signal thus extracted and wherein said control means is arranged to extract a color burst signal serving as a phase reference at the time of reproduction which is added to the time-base compressed and combined chrominance component signals outputted by said reproducing means, during a horizontal blanking period provided at the front of a portion of the time-base-compressed and combined chrominance component signals, said portion corresponding to the left image and during a blanking period provided at between portions of the time-base-compressed and combined chrominance component signals, said portions corresponding respectively to the left and right images and outputting a signal thus extracted.

* * * * *